United States Patent
Perlman et al.

(10) Patent No.: US 8,676,639 B2
(45) Date of Patent: Mar. 18, 2014

(54) SYSTEM AND METHOD FOR PROMOTION PROCESSING AND AUTHORIZATION

(75) Inventors: Jeffrey William Perlman, Gordon (AU); Caroline Grace Dempsey, Beacon Hill (AU)

(73) Assignee: Visa International Service Association, Foster City, CA (US)

( * ) Notice: Subject to any disclaimer, the term of this patent is extended or adjusted under 35 U.S.C. 154(b) by 437 days.

(21) Appl. No.: 12/778,485

(22) Filed: May 12, 2010

(65) Prior Publication Data

US 2011/0106601 A1 May 5, 2011

Related U.S. Application Data

(60) Provisional application No. 61/256,143, filed on Oct. 29, 2009.

(51) Int. Cl.
*G06Q 30/00* (2012.01)
(52) U.S. Cl.
USPC ....................................................... 705/14.1
(58) Field of Classification Search
USPC ............................................................ 705/14
See application file for complete search history.

(56) References Cited

U.S. PATENT DOCUMENTS

| | | | |
|---|---|---|---|
| 3,652,795 | A | 3/1972 | Wolf et al. |
| 4,321,672 | A | 3/1982 | Braun et al. |
| 4,341,951 | A | 7/1982 | Benton |
| 4,454,414 | A | 6/1984 | Benton |
| 4,645,873 | A | 2/1987 | Chomet |
| 4,713,761 | A | 12/1987 | Sharpe et al. |
| 4,750,119 | A | 6/1988 | Cohen et al. |
| 4,823,264 | A | 4/1989 | Deming |
| RE32,985 | E | 7/1989 | Nagata et al. |
| 4,866,611 | A | 9/1989 | Cree et al. |
| 4,906,826 | A | 3/1990 | Spencer |
| 4,914,590 | A | 4/1990 | Loatman et al. |

(Continued)

FOREIGN PATENT DOCUMENTS

| | | |
|---|---|---|
| AU | 640855 | 9/1993 |
| JP | 2000357204 | 12/2000 |

(Continued)

OTHER PUBLICATIONS

Posting Payments, http://msdn.microsoft.com/en-us/library/aa480428(v=MSDN.10).aspx, 1998 (MSDN).
International Patent Application PCT/US2012/031171, International Search Report and Written Opinion, Oct. 12, 2012.
Li, Wen-Syan, "Knowledge Gathering and Matching in Heterogeneous Databases," Working Notes of the AAAI Spring Symposium on Information Gathering, pp. 116-1216, Mar. 27, 1995.
Mielikainen, Taneli, "Privacy Problems with Anonymized Transaction Databases," 7th International Conference on Discovery Science, pp. 219-229, Oct. 2, 2004.

(Continued)

*Primary Examiner* — Matthew L Hamilton
(74) *Attorney, Agent, or Firm* — Greenberg Traurig LLP

(57) ABSTRACT

An example funds facilitation system that facilitates transactions between a payer and payee includes a promotion processing system that facilitates the provision of promotions to account holders on the funds facilitation system. The party offering the promotion may be a merchant/payee that also has an account with the funds facilitation system. The promotion processing system applies promotion rules based on the identity of the merchant/payee and upon conditions placed on the promotion that identify a payer or a group of payers to receive the promotion. A user interface is provided for generating promotion rules and monitoring promotions. A user interface is also provided that displays unused promotion and gift codes and links to merchant/payee websites associated with the unused codes. The funds facilitation system can also provide authorization for purchases based on a condition, such as the age of the payer.

31 Claims, 7 Drawing Sheets

(56) References Cited

U.S. PATENT DOCUMENTS

| | | |
|---|---|---|
| 4,941,090 A | 7/1990 | McCarthy |
| 5,010,485 A | 4/1991 | Bigari |
| 5,025,372 A | 6/1991 | Burton et al. |
| 5,132,521 A | 7/1992 | Smith et al. |
| 5,220,501 A | 6/1993 | Lawlor et al. |
| 5,231,571 A | 7/1993 | D'Agostino |
| 5,326,960 A | 7/1994 | Tannenbaum |
| 5,329,589 A | 7/1994 | Fraser et al. |
| 5,350,906 A | 9/1994 | Brody et al. |
| 5,351,296 A | 9/1994 | Sullivan |
| 5,383,113 A | 1/1995 | Kight et al. |
| 5,401,946 A | 3/1995 | Weinblatt |
| 5,412,730 A | 5/1995 | Jones |
| 5,440,634 A | 8/1995 | Jones et al. |
| 5,450,537 A | 9/1995 | Hirai et al. |
| 5,453,601 A | 9/1995 | Rosen |
| 5,455,407 A | 10/1995 | Rosen |
| 5,537,314 A | 7/1996 | Kanter |
| 5,557,516 A | 9/1996 | Hogan |
| 5,581,764 A | 12/1996 | Fitzgerald et al. |
| 5,592,560 A | 1/1997 | Deaton et al. |
| 5,621,812 A | 4/1997 | Deaton et al. |
| 5,623,547 A | 4/1997 | Jones et al. |
| 5,638,457 A | 6/1997 | Deaton et al. |
| 5,640,577 A | 6/1997 | Scharmer |
| 5,659,165 A | 8/1997 | Jennings et al. |
| 5,684,990 A | 11/1997 | Boothby |
| 5,687,322 A | 11/1997 | Deaton et al. |
| 5,692,132 A | 11/1997 | Hogan |
| 5,699,528 A | 12/1997 | Hogan |
| 5,710,886 A | 1/1998 | Christensen et al. |
| 5,717,989 A | 2/1998 | Tozzoli et al. |
| 5,742,845 A | 4/1998 | Wagner |
| 5,745,574 A | 4/1998 | Muftic |
| 5,790,790 A | 8/1998 | Smith et al. |
| 5,793,302 A | 8/1998 | Stambler |
| 5,794,259 A | 8/1998 | Kikinis |
| 5,799,087 A | 8/1998 | Rosen |
| 5,815,657 A | 9/1998 | Williams et al. |
| 5,832,463 A | 11/1998 | Funk |
| 5,850,442 A | 12/1998 | Muftic |
| 5,862,325 A | 1/1999 | Reed et al. |
| 5,873,072 A | 2/1999 | Kight et al. |
| 5,884,288 A | 3/1999 | Chang et al. |
| 5,884,312 A | 3/1999 | Dustan et al. |
| 5,890,140 A | 3/1999 | Clark et al. |
| 5,893,120 A | 4/1999 | Nemes |
| 5,903,881 A | 5/1999 | Schrader et al. |
| 5,920,629 A | 7/1999 | Rosen |
| 5,924,080 A | 7/1999 | Johnson et al. |
| 5,946,667 A | 8/1999 | Tull et al. |
| 5,953,423 A | 9/1999 | Rosen |
| 5,956,391 A | 9/1999 | Melen et al. |
| 5,956,700 A | 9/1999 | Landry |
| 5,960,411 A | 9/1999 | Hartman et al. |
| 5,963,647 A | 10/1999 | Downing et al. |
| 5,966,696 A | 10/1999 | Giraud |
| 5,966,698 A | 10/1999 | Pollin |
| 5,974,148 A | 10/1999 | Stambler |
| 5,974,396 A | 10/1999 | Anderson et al. |
| 5,974,430 A | 10/1999 | Mutschler, III et al. |
| 6,012,041 A | 1/2000 | Brewer et al. |
| 6,012,044 A | 1/2000 | Maggioncalda et al. |
| 6,012,045 A | 1/2000 | Barzilai et al. |
| 6,012,048 A | 1/2000 | Gustin et al. |
| 6,029,150 A | 2/2000 | Kravitz |
| 6,032,133 A | 2/2000 | Hilt et al. |
| 6,035,280 A | 3/2000 | Christensen et al. |
| 6,055,573 A | 4/2000 | Gardenswartz et al. |
| 6,061,660 A | 5/2000 | Eggleston et al. |
| 6,065,675 A | 5/2000 | Teicher |
| 6,067,621 A | 5/2000 | Yu et al. |
| 6,070,147 A | 5/2000 | Harms et al. |
| 6,088,717 A | 7/2000 | Reed et al. |
| 6,092,053 A | 7/2000 | Boesch et al. |
| 6,101,484 A | 8/2000 | Halbert et al. |
| 6,119,101 A | 9/2000 | Peckover |
| 6,119,933 A | 9/2000 | Wong et al. |
| 6,173,272 B1 | 1/2001 | Thomas et al. |
| 6,192,407 B1 | 2/2001 | Smith et al. |
| 6,216,129 B1 | 4/2001 | Eldering |
| 6,226,624 B1 | 5/2001 | Watson et al. |
| 6,226,642 B1 | 5/2001 | Beranek et al. |
| 6,227,447 B1 | 5/2001 | Campisano |
| 6,282,516 B1 | 8/2001 | Giuliani |
| 6,282,522 B1 | 8/2001 | Davis |
| 6,285,983 B1 | 9/2001 | Jenkins |
| 6,289,322 B1 | 9/2001 | Kitchen et al. |
| 6,298,330 B1 | 10/2001 | Gardenswartz |
| 6,307,958 B1 | 10/2001 | Deaton et al. |
| 6,321,201 B1 | 11/2001 | Dahl |
| 6,324,519 B1 | 11/2001 | Eldering |
| 6,327,574 B1 | 12/2001 | Kramer et al. |
| 6,327,578 B1 | 12/2001 | Linehan |
| 6,330,550 B1 | 12/2001 | Brisebois et al. |
| 6,332,126 B1 | 12/2001 | Pierce et al. |
| 6,332,134 B1 | 12/2001 | Foster |
| 6,334,110 B1 | 12/2001 | Walter et al. |
| 6,341,724 B2 | 1/2002 | Campisano |
| 6,351,739 B1 | 2/2002 | Egendorf |
| 6,360,205 B1 | 3/2002 | Iyengar et al. |
| 6,377,935 B1 | 4/2002 | Deaton et al. |
| 6,421,729 B1 | 7/2002 | Paltenghe et al. |
| 6,424,249 B1 | 7/2002 | Houvener |
| 6,450,407 B1 | 9/2002 | Freeman et al. |
| 6,467,684 B2 | 10/2002 | Fite et al. |
| 6,487,538 B1 | 11/2002 | Gupta et al. |
| 6,487,599 B1 | 11/2002 | Smith et al. |
| 6,490,601 B1 | 12/2002 | Markus et al. |
| 6,499,042 B1 | 12/2002 | Markus |
| 6,505,168 B1 | 1/2003 | Rothman |
| 6,519,571 B1 | 2/2003 | Guheen |
| 6,547,129 B2 | 4/2003 | Nichols et al. |
| 6,604,089 B1 | 8/2003 | Van Horn et al. |
| 6,604,239 B1 | 8/2003 | Kohen |
| 6,609,113 B1 | 8/2003 | O'Leary et al. |
| 6,631,356 B1 | 10/2003 | Van Horn et al. |
| 6,631,372 B1 | 10/2003 | Graham |
| 6,742,003 B2 | 5/2004 | Heckerman et al. |
| 6,748,367 B1 | 6/2004 | Lee |
| 6,757,710 B2 | 6/2004 | Reed |
| 6,834,110 B1 | 12/2004 | Marconcini et al. |
| 6,850,996 B2 | 2/2005 | Wagner |
| 6,856,992 B2 | 2/2005 | Britton et al. |
| 6,871,288 B2 | 3/2005 | Russikoff |
| 6,873,974 B1 | 3/2005 | Schutzer |
| 6,901,406 B2 | 5/2005 | Nabe |
| 6,907,476 B2 | 6/2005 | Wagner |
| 6,915,271 B1 | 7/2005 | Meyer et al. |
| 6,922,686 B2 | 7/2005 | Okamoto et al. |
| 6,932,268 B1 | 8/2005 | McCoy et al. |
| 6,934,508 B2 | 8/2005 | Ceresoli et al. |
| 6,934,690 B1 | 8/2005 | Van Horn et al. |
| 6,938,022 B1 | 8/2005 | Singhal |
| 6,941,376 B2 | 9/2005 | Mitchell et al. |
| 6,963,843 B1 | 11/2005 | Takatsu et al. |
| 6,996,560 B1 | 2/2006 | Choi |
| 7,003,476 B1 | 2/2006 | Samra |
| 7,006,993 B1 | 2/2006 | Cheong et al. |
| 7,024,374 B1 | 4/2006 | Day |
| 7,024,409 B2 | 4/2006 | Iyengar |
| 7,035,855 B1 | 4/2006 | Kilger et al. |
| 7,039,599 B2 | 5/2006 | Merriman |
| 7,062,510 B1 | 6/2006 | Eldering |
| 7,062,706 B2 | 6/2006 | Maxwell et al. |
| 7,072,847 B2 | 7/2006 | Ulenas et al. |
| 7,089,208 B1 | 8/2006 | Levchin et al. |
| 7,092,913 B2 | 8/2006 | Cannon, Jr. |
| 7,099,850 B1 | 8/2006 | Mann, II et al. |
| 7,103,571 B2 | 9/2006 | Shigemi et al. |
| 7,107,230 B1 | 9/2006 | Halbert et al. |
| 7,107,249 B2 | 9/2006 | Dively |
| 7,120,590 B1 | 10/2006 | Eisen |
| 7,124,099 B2 | 10/2006 | Mesaros |

(56) References Cited

U.S. PATENT DOCUMENTS

| | | |
|---|---|---|
| 7,127,427 B1 | 10/2006 | Casper |
| 7,143,143 B1 | 11/2006 | Thompson |
| 7,146,330 B1 | 12/2006 | Alon et al. |
| 7,158,943 B2 | 1/2007 | Van Der Riet |
| 7,158,955 B2 | 1/2007 | Dively |
| 7,159,180 B2 | 1/2007 | Ward |
| 7,162,436 B1 | 1/2007 | Eckel, Jr. |
| 7,165,037 B2 | 1/2007 | Lazarus et al. |
| 7,175,074 B2 | 2/2007 | Mejias et al. |
| 7,177,822 B2 | 2/2007 | Mahmood et al. |
| 7,177,838 B1 | 2/2007 | Ling |
| 7,181,412 B1 | 2/2007 | Fulgoni |
| 7,181,419 B1 | 2/2007 | Mesaros |
| 7,194,422 B1 | 3/2007 | St. John Killick |
| 7,194,427 B1 | 3/2007 | Van Horn et al. |
| 7,216,292 B1 | 5/2007 | Snapper et al. |
| 7,225,142 B1 | 5/2007 | Apte |
| 7,231,372 B1 | 6/2007 | Prange et al. |
| 7,249,097 B2 | 7/2007 | Hutchison et al. |
| 7,249,099 B2 | 7/2007 | Ling |
| 7,251,656 B2 | 7/2007 | Keown et al. |
| 7,254,569 B2 | 8/2007 | Goodman et al. |
| 7,257,581 B1 | 8/2007 | Steele et al. |
| 7,260,724 B1 | 8/2007 | Dickinson et al. |
| 7,260,837 B2 | 8/2007 | Abraham |
| 7,263,498 B1 | 8/2007 | Van Horn et al. |
| 7,264,152 B2 | 9/2007 | Tsuei et al. |
| 7,269,578 B2 | 9/2007 | Sweeney |
| 7,299,194 B1 | 11/2007 | Manganaris |
| 7,324,972 B1 | 1/2008 | Oliver et al. |
| 7,328,169 B2 | 2/2008 | Temares |
| 7,328,189 B2 | 2/2008 | Ling |
| 7,333,998 B2 | 2/2008 | Heckerman et al. |
| 7,334,184 B1 | 2/2008 | Simons |
| 7,337,127 B1 | 2/2008 | Smith |
| 7,337,144 B1 | 2/2008 | Blinn et al. |
| 7,337,953 B2 | 3/2008 | Sgambati et al. |
| 7,340,438 B2 | 3/2008 | Nordman et al. |
| 7,343,351 B1 | 3/2008 | Bishop et al. |
| 7,346,577 B1 | 3/2008 | Williams et al. |
| 7,346,587 B1 | 3/2008 | Goldstein et al. |
| 7,347,361 B2 | 3/2008 | Lovett |
| 7,350,139 B1 | 3/2008 | Simons |
| RE40,220 E | 4/2008 | Nichols et al. |
| 7,359,866 B2 | 4/2008 | Farat |
| 7,360,251 B2 | 4/2008 | Spalink et al. |
| 7,363,246 B1 | 4/2008 | Van Horn et al. |
| 7,366,702 B2 | 4/2008 | David |
| 7,366,703 B2 | 4/2008 | Gray et al. |
| 7,373,311 B2 | 5/2008 | Lambert et al. |
| 7,376,621 B1 | 5/2008 | Ling |
| 7,379,919 B2 | 5/2008 | Hogan et al. |
| 7,392,536 B2 | 6/2008 | Jamieson et al. |
| 7,395,241 B1 | 7/2008 | Cook et al. |
| 7,398,225 B2 | 7/2008 | Voltmer et al. |
| 7,401,731 B1 | 7/2008 | Pletz et al. |
| 7,412,420 B2 | 8/2008 | Holdsworth |
| 7,415,443 B2 | 8/2008 | Hobson et al. |
| 7,424,439 B1 | 9/2008 | Fayyad et al. |
| 7,424,441 B2 | 9/2008 | George |
| 7,426,530 B1 | 9/2008 | Rosko et al. |
| 7,437,327 B2 | 10/2008 | Lam et al. |
| 7,437,757 B2 | 10/2008 | Holdsworth |
| 7,444,658 B1 | 10/2008 | Matz et al. |
| 7,444,672 B2 | 10/2008 | Ellmore |
| 7,447,662 B2 | 11/2008 | Gibson |
| 7,458,507 B2 | 12/2008 | Fillinger et al. |
| 7,461,028 B2 | 12/2008 | Wronski, Jr. |
| 7,461,265 B2 | 12/2008 | Ellmore |
| 7,461,776 B2 | 12/2008 | Steiger, Jr. |
| 7,463,946 B2 | 12/2008 | Smith et al. |
| 7,471,818 B1 | 12/2008 | Price et al. |
| 7,472,171 B2 | 12/2008 | Miller et al. |
| 7,480,627 B1 | 1/2009 | Van Horn et al. |
| 7,483,845 B2 | 1/2009 | Vetelainen |
| 7,487,127 B2 | 2/2009 | Weichert et al. |
| 7,490,052 B2 | 2/2009 | Kilger et al. |
| 7,493,655 B2 | 2/2009 | Brown |
| 7,496,952 B2 | 2/2009 | Edwards, Jr. et al. |
| 7,500,606 B2 | 3/2009 | Park et al. |
| 7,502,833 B2 | 3/2009 | Schaeck |
| 7,512,552 B2 | 3/2009 | Karas et al. |
| 7,519,560 B2 | 4/2009 | Lam et al. |
| 7,523,182 B2 | 4/2009 | Godwin |
| 7,526,485 B2 | 4/2009 | Hagan et al. |
| 7,533,038 B2 | 5/2009 | Blume |
| 7,533,063 B2 | 5/2009 | Kianian |
| 7,533,064 B1 | 5/2009 | Boesch |
| 7,533,130 B2 | 5/2009 | Narayana et al. |
| 7,533,828 B2 | 5/2009 | Ong |
| 7,536,354 B1 | 5/2009 | deGroeve et al. |
| 7,536,360 B2 | 5/2009 | Stolfo et al. |
| 7,540,408 B2 | 6/2009 | Levine et al. |
| 7,543,738 B1 | 6/2009 | Saunders et al. |
| 7,546,272 B2 | 6/2009 | Loy |
| 7,546,275 B1 | 6/2009 | Herzberg et al. |
| 7,548,988 B2 | 6/2009 | Philyaw et al. |
| 7,552,069 B2 | 6/2009 | Kepecs |
| 7,552,467 B2 | 6/2009 | Lindsay |
| 7,562,030 B1 | 7/2009 | Shapira |
| 7,568,631 B2 | 8/2009 | Gibbs et al. |
| 7,571,140 B2 | 8/2009 | Weichert et al. |
| 7,577,599 B2 | 8/2009 | Sanchez et al. |
| 7,578,430 B2 | 8/2009 | Michelsen |
| 7,578,435 B2 | 8/2009 | Suk |
| 7,580,857 B2 | 8/2009 | VanFleet et al. |
| 7,580,898 B2 | 8/2009 | Brown et al. |
| 7,581,257 B1 | 8/2009 | O'Hara |
| 7,584,153 B2 | 9/2009 | Brown et al. |
| 7,590,595 B2 | 9/2009 | Pessin |
| 7,593,871 B1 | 9/2009 | Mesaros |
| 7,606,760 B2 | 10/2009 | Hutchison et al. |
| 7,610,233 B1 | 10/2009 | Leong et al. |
| 7,613,628 B2 | 11/2009 | Ariff et al. |
| 7,627,523 B1 | 12/2009 | Symonds et al. |
| 7,627,531 B2 | 12/2009 | Breck et al. |
| 7,657,531 B2 | 2/2010 | Bisbee et al. |
| 7,660,779 B2 | 2/2010 | Goodman et al. |
| 7,664,699 B1 | 2/2010 | Powell |
| 7,680,679 B1 | 3/2010 | Patricelli et al. |
| 7,689,463 B1 | 3/2010 | Mesaros |
| 7,689,469 B1 | 3/2010 | Mesaros |
| 7,693,748 B1 | 4/2010 | Mesaros |
| 7,694,135 B2 | 4/2010 | Rowan et al. |
| 7,698,221 B2 | 4/2010 | Blinn et al. |
| 7,702,580 B1 | 4/2010 | Voth et al. |
| 7,707,105 B2 | 4/2010 | O'Neil |
| 7,711,621 B2 | 5/2010 | Huang et al. |
| 7,716,596 B2 | 5/2010 | Cao et al. |
| 7,729,925 B2 | 6/2010 | Maritzen et al. |
| 7,729,945 B1 | 6/2010 | Katz et al. |
| 7,729,977 B2 | 6/2010 | Xiao et al. |
| 7,747,473 B1 | 6/2010 | Mesaros |
| 7,761,374 B2 | 7/2010 | Sahota et al. |
| 7,828,206 B2 | 11/2010 | Hessburg et al. |
| 7,904,337 B2 | 3/2011 | Morsa |
| 7,917,388 B2 | 3/2011 | Van Der Riet |
| 7,953,219 B2 | 5/2011 | Freedman et al. |
| 8,055,536 B1 | 11/2011 | Olaiya et al. |
| 8,103,545 B2 | 1/2012 | Ramer et al. |
| 8,131,875 B1 | 3/2012 | Chen et al. |
| 8,140,389 B2 | 3/2012 | Altberg et al. |
| 2001/0014878 A1 | 8/2001 | Mitra et al. |
| 2001/0027413 A1 | 10/2001 | Bhutta |
| 2001/0032182 A1 | 10/2001 | Kumar et al. |
| 2001/0039511 A1* | 11/2001 | Duckworth et al. ............ 705/14 |
| 2001/0039535 A1 | 11/2001 | Tsiounis et al. |
| 2001/0049620 A1 | 12/2001 | Blasko |
| 2001/0054148 A1 | 12/2001 | Hoornaert et al. |
| 2001/0056405 A1 | 12/2001 | Muyres et al. |
| 2002/0002495 A1 | 1/2002 | Ullman |
| 2002/0004733 A1 | 1/2002 | Addante |
| 2002/0004772 A1 | 1/2002 | Templeton et al. |
| 2002/0016769 A1 | 2/2002 | Barbara et al. |

(56) References Cited

U.S. PATENT DOCUMENTS

| | | |
|---|---|---|
| 2002/0019768 A1 | 2/2002 | Fredrickson et al. |
| 2002/0032602 A1 | 3/2002 | Lanzillo et al. |
| 2002/0032904 A1 | 3/2002 | Lerner |
| 2002/0042738 A1 | 4/2002 | Srinivasanet et al. |
| 2002/0046185 A1* | 4/2002 | Villart et al. .................... 705/64 |
| 2002/0046187 A1 | 4/2002 | Vargaset et al. |
| 2002/0046341 A1 | 4/2002 | Kazaks et al. |
| 2002/0052841 A1 | 5/2002 | Guthrie et al. |
| 2002/0053076 A1 | 5/2002 | Landesmann |
| 2002/0059100 A1 | 5/2002 | Shore |
| 2002/0059141 A1 | 5/2002 | Davies et al. |
| 2002/0065723 A1 | 5/2002 | Anderson et al. |
| 2002/0072931 A1 | 6/2002 | Card |
| 2002/0073027 A1 | 6/2002 | Hui et al. |
| 2002/0083011 A1 | 6/2002 | Kobayashi |
| 2002/0095387 A1 | 7/2002 | Sosa et al. |
| 2002/0099649 A1 | 7/2002 | Lee et al. |
| 2002/0107738 A1 | 8/2002 | Beach et al. |
| 2002/0111867 A1* | 8/2002 | Walker et al. .................... 705/14 |
| 2002/0120582 A1 | 8/2002 | Elston et al. |
| 2002/0123928 A1 | 9/2002 | Eldering et al. |
| 2002/0128908 A1 | 9/2002 | Levin et al. |
| 2002/0133400 A1 | 9/2002 | Terry et al. |
| 2002/0133405 A1 | 9/2002 | Newnam et al. |
| 2002/0138346 A1 | 9/2002 | Kodaka |
| 2002/0147645 A1 | 10/2002 | Alao et al. |
| 2002/0161625 A1 | 10/2002 | Brito-Valladares et al. |
| 2002/0174013 A1 | 11/2002 | Freeman et al. |
| 2002/0184147 A1 | 12/2002 | Boulger |
| 2002/0194137 A1 | 12/2002 | Park et al. |
| 2003/0004808 A1 | 1/2003 | Elhaoussine et al. |
| 2003/0014633 A1 | 1/2003 | Gruber |
| 2003/0018652 A1 | 1/2003 | Heckerman et al. |
| 2003/0047602 A1 | 3/2003 | Iida et al. |
| 2003/0061111 A1 | 3/2003 | Dutta et al. |
| 2003/0074267 A1 | 4/2003 | Acharya et al. |
| 2003/0074328 A1 | 4/2003 | Schiff et al. |
| 2003/0078864 A1 | 4/2003 | Hardesty et al. |
| 2003/0097331 A1 | 5/2003 | Cohen |
| 2003/0101134 A1 | 5/2003 | Liu et al. |
| 2003/0101137 A1 | 5/2003 | Wronski, Jr. |
| 2003/0110136 A1 | 6/2003 | Wells et al. |
| 2003/0115113 A1 | 6/2003 | Duncan |
| 2003/0135434 A1 | 7/2003 | Jain |
| 2003/0183689 A1 | 10/2003 | Swift et al. |
| 2003/0191832 A1 | 10/2003 | Satyavolu et al. |
| 2003/0197061 A1 | 10/2003 | Din |
| 2003/0212642 A1 | 11/2003 | Weller et al. |
| 2003/0233334 A1 | 12/2003 | Smith |
| 2004/0019518 A1 | 1/2004 | Abraham |
| 2004/0024632 A1 | 2/2004 | Perry |
| 2004/0039694 A1 | 2/2004 | Dunn et al. |
| 2004/0044621 A1 | 3/2004 | Huang et al. |
| 2004/0054577 A1 | 3/2004 | Inoue et al. |
| 2004/0054581 A1 | 3/2004 | Redford |
| 2004/0054591 A1 | 3/2004 | Spaeth et al. |
| 2004/0073482 A1 | 4/2004 | Wiggins et al. |
| 2004/0093303 A1 | 5/2004 | Picciallo |
| 2004/0099730 A1 | 5/2004 | Tuchler et al. |
| 2004/0103057 A1 | 5/2004 | Melbert et al. |
| 2004/0118914 A1 | 6/2004 | Smith et al. |
| 2004/0122735 A1 | 6/2004 | Meshkin |
| 2004/0122736 A1 | 6/2004 | Strock et al. |
| 2004/0122770 A1 | 6/2004 | Craig et al. |
| 2004/0127192 A1 | 7/2004 | Ceresoli et al. |
| 2004/0128508 A1 | 7/2004 | Wheeler et al. |
| 2004/0133474 A1 | 7/2004 | Tami et al. |
| 2004/0181554 A1 | 9/2004 | Heckerman et al. |
| 2004/0193489 A1 | 9/2004 | Boyd et al. |
| 2004/0193685 A1 | 9/2004 | Proehl |
| 2004/0225509 A1 | 11/2004 | Andre |
| 2004/0225603 A1 | 11/2004 | Allen et al. |
| 2004/0236692 A1 | 11/2004 | Sellen et al. |
| 2004/0249650 A1 | 12/2004 | Freedman et al. |
| 2004/0249710 A1 | 12/2004 | Smith et al. |
| 2005/0005094 A1 | 1/2005 | Jamieson et al. |
| 2005/0055275 A1 | 3/2005 | Newman et al. |
| 2005/0071225 A1 | 3/2005 | Bortolin et al. |
| 2005/0071227 A1 | 3/2005 | Hammad et al. |
| 2005/0071230 A1 | 3/2005 | Mankoff |
| 2005/0086169 A1 | 4/2005 | Wells et al. |
| 2005/0097049 A1 | 5/2005 | Writer et al. |
| 2005/0131762 A1 | 6/2005 | Bharat et al. |
| 2005/0131792 A1 | 6/2005 | Rowe |
| 2005/0131816 A1 | 6/2005 | Britto et al. |
| 2005/0147225 A1 | 7/2005 | Mallick et al. |
| 2005/0149455 A1 | 7/2005 | Bruesewitz et al. |
| 2005/0160002 A1 | 7/2005 | Roetter |
| 2005/0160003 A1 | 7/2005 | Berardi et al. |
| 2005/0199709 A1 | 9/2005 | Linlor |
| 2005/0211763 A1 | 9/2005 | Sgambati et al. |
| 2005/0216823 A1 | 9/2005 | Petersen et al. |
| 2006/0053056 A1 | 3/2006 | Alspach-Goss et al. |
| 2006/0069619 A1 | 3/2006 | Walker et al. |
| 2006/0080238 A1 | 4/2006 | Nielsen et al. |
| 2006/0089906 A1 | 4/2006 | Rowley |
| 2006/0131390 A1 | 6/2006 | Kim |
| 2006/0143071 A1 | 6/2006 | Hofmann |
| 2006/0143075 A1 | 6/2006 | Carr et al. |
| 2006/0143122 A1 | 6/2006 | Sines et al. |
| 2006/0143690 A1 | 6/2006 | Lin et al. |
| 2006/0161474 A1* | 7/2006 | Diamond et al. ............... 705/14 |
| 2006/0161527 A1 | 7/2006 | Dwork et al. |
| 2006/0167818 A1 | 7/2006 | Wentker et al. |
| 2006/0178957 A1 | 8/2006 | LeClaire |
| 2006/0190300 A1 | 8/2006 | Drucker |
| 2006/0190337 A1 | 8/2006 | Ayers, Jr. |
| 2006/0218038 A1 | 9/2006 | Grider |
| 2006/0230053 A1 | 10/2006 | Eldering |
| 2006/0230265 A1 | 10/2006 | Krishna |
| 2006/0253320 A1 | 11/2006 | Heywood |
| 2006/0253323 A1 | 11/2006 | Phan et al. |
| 2006/0265280 A1 | 11/2006 | Nakada et al. |
| 2006/0265429 A1 | 11/2006 | Pendergast |
| 2006/0287916 A1 | 12/2006 | Starr et al. |
| 2006/0293948 A1 | 12/2006 | Weinblatt |
| 2006/0294005 A1 | 12/2006 | Drepak |
| 2007/0011093 A1 | 1/2007 | Tree |
| 2007/0033104 A1 | 2/2007 | Collins et al. |
| 2007/0038516 A1 | 2/2007 | Apple et al. |
| 2007/0055597 A1 | 3/2007 | Patel |
| 2007/0067297 A1 | 3/2007 | Kublickis et al. |
| 2007/0084917 A1 | 4/2007 | Fajkowski |
| 2007/0100691 A1 | 5/2007 | Patterson et al. |
| 2007/0124201 A1 | 5/2007 | Hu et al. |
| 2007/0136211 A1 | 6/2007 | Brown et al. |
| 2007/0156517 A1 | 7/2007 | Kaplan et al. |
| 2007/0162377 A1 | 7/2007 | Williams |
| 2007/0174295 A1 | 7/2007 | Abraham |
| 2007/0192121 A1 | 8/2007 | Routson |
| 2007/0192122 A1 | 8/2007 | Routson et al. |
| 2007/0198354 A1* | 8/2007 | Senghore et al. ............... 705/14 |
| 2007/0198432 A1 | 8/2007 | Pitroda et al. |
| 2007/0214259 A1 | 9/2007 | Ahmed et al. |
| 2007/0219865 A1 | 9/2007 | Leining |
| 2007/0219866 A1 | 9/2007 | Wolf et al. |
| 2007/0226056 A1 | 9/2007 | Belanger |
| 2007/0226061 A1 | 9/2007 | Chen et al. |
| 2007/0239532 A1 | 10/2007 | Benson et al. |
| 2007/0244741 A1 | 10/2007 | Blume |
| 2007/0255662 A1 | 11/2007 | Tumminaro |
| 2007/0260521 A1 | 11/2007 | Van Der Riet |
| 2007/0260536 A1 | 11/2007 | Stone |
| 2007/0260736 A1 | 11/2007 | Miller |
| 2007/0265923 A1 | 11/2007 | Krassner et al. |
| 2007/0276944 A1 | 11/2007 | Samovar et al. |
| 2007/0282681 A1 | 12/2007 | Shubert et al. |
| 2007/0288313 A1* | 12/2007 | Brodson et al. ................ 705/14 |
| 2007/0291741 A1 | 12/2007 | Hwang |
| 2008/0004884 A1 | 1/2008 | Flake |
| 2008/0015985 A1 | 1/2008 | Abhari et al. |
| 2008/0021772 A1 | 1/2008 | Aloni et al. |
| 2008/0046358 A1 | 2/2008 | Holm-Blagg |
| 2008/0059302 A1 | 3/2008 | Fordyce, III |

(56) References Cited

U.S. PATENT DOCUMENTS

| | | |
|---|---|---|
| 2008/0059303 A1 | 3/2008 | Fordyce, III |
| 2008/0059306 A1 | 3/2008 | Fordyce, III |
| 2008/0059307 A1 | 3/2008 | Fordyce, III |
| 2008/0065507 A1 | 3/2008 | Morrison et al. |
| 2008/0071587 A1 | 3/2008 | Granucci et al. |
| 2008/0071680 A1 | 3/2008 | Sheets |
| 2008/0077487 A1 | 3/2008 | Davis |
| 2008/0077499 A1 | 3/2008 | Ariff et al. |
| 2008/0082393 A1 | 4/2008 | Ozzie et al. |
| 2008/0082397 A1 | 4/2008 | Dennison et al. |
| 2008/0082418 A1 | 4/2008 | Fordyce, III |
| 2008/0091600 A1 | 4/2008 | Egnatios et al. |
| 2008/0091619 A1 | 4/2008 | Perlman et al. |
| 2008/0103887 A1 | 5/2008 | Oldham |
| 2008/0103888 A1 | 5/2008 | Weir |
| 2008/0110983 A1 | 5/2008 | Ashfield |
| 2008/0120182 A1 | 5/2008 | Arnold et al. |
| 2008/0120218 A1 | 5/2008 | Reid et al. |
| 2008/0133351 A1 | 6/2008 | White et al. |
| 2008/0134228 A1 | 6/2008 | Dion et al. |
| 2008/0147731 A1 | 6/2008 | Narayana et al. |
| 2008/0154703 A1 | 6/2008 | Flake |
| 2008/0154704 A1 | 6/2008 | Flake |
| 2008/0154727 A1 | 6/2008 | Carlson |
| 2008/0162258 A1 | 7/2008 | Kala et al. |
| 2008/0162269 A1 | 7/2008 | Gilbert |
| 2008/0162295 A1 | 7/2008 | Bedier |
| 2008/0167991 A1 | 7/2008 | Carlson et al. |
| 2008/0167992 A1 | 7/2008 | Kokernak |
| 2008/0177602 A1 | 7/2008 | Sopher et al. |
| 2008/0177796 A1 | 7/2008 | Eldering |
| 2008/0184117 A1 | 7/2008 | Alsbury et al. |
| 2008/0195465 A1 | 8/2008 | Redmond et al. |
| 2008/0195473 A1 | 8/2008 | Laramy |
| 2008/0201226 A1 | 8/2008 | Carlson |
| 2008/0201769 A1 | 8/2008 | Finn |
| 2008/0208762 A1 | 8/2008 | Arthur et al. |
| 2008/0215436 A1 | 9/2008 | Roberts et al. |
| 2008/0217397 A1 | 9/2008 | Degliantoni et al. |
| 2008/0221972 A1 | 9/2008 | Megdal et al. |
| 2008/0228653 A1 | 9/2008 | Holdsworrth |
| 2008/0235243 A1 | 9/2008 | Lee et al. |
| 2008/0242317 A1 | 10/2008 | Abhyanker |
| 2008/0255940 A1* | 10/2008 | Perreault et al. ............... 705/14 |
| 2008/0275771 A1 | 11/2008 | Levine |
| 2008/0281668 A1 | 11/2008 | Nurminen |
| 2008/0281699 A1 | 11/2008 | Whitehead |
| 2008/0288405 A1 | 11/2008 | John |
| 2008/0289022 A1 | 11/2008 | Chiu |
| 2008/0300973 A1 | 12/2008 | DeWitt et al. |
| 2008/0301037 A1 | 12/2008 | Monk |
| 2008/0301102 A1 | 12/2008 | Liang |
| 2008/0306790 A1 | 12/2008 | Otto |
| 2008/0306877 A1 | 12/2008 | Mandeles et al. |
| 2008/0318559 A1 | 12/2008 | Porco et al. |
| 2008/0319843 A1 | 12/2008 | Moser |
| 2008/0319847 A1 | 12/2008 | Shepard |
| 2008/0320512 A1 | 12/2008 | Knight |
| 2009/0006363 A1 | 1/2009 | Canny |
| 2009/0006646 A1 | 1/2009 | Duarte |
| 2009/0018895 A1 | 1/2009 | Weinblatt et al. |
| 2009/0030793 A1 | 1/2009 | Fordyce, III |
| 2009/0036103 A1 | 2/2009 | Byerley et al. |
| 2009/0043593 A1 | 2/2009 | Herbrich et al. |
| 2009/0048884 A1 | 2/2009 | Olives et al. |
| 2009/0063345 A1 | 3/2009 | Erikson |
| 2009/0070219 A1 | 3/2009 | D'Angelo |
| 2009/0070225 A1 | 3/2009 | Matz et al. |
| 2009/0076896 A1 | 3/2009 | DeWitt et al. |
| 2009/0094148 A1 | 4/2009 | Gilder et al. |
| 2009/0112703 A1 | 4/2009 | Brown |
| 2009/0112721 A1 | 4/2009 | Hammad et al. |
| 2009/0119160 A1 | 5/2009 | Woda |
| 2009/0119167 A1 | 5/2009 | Kendall |
| 2009/0119170 A1 | 5/2009 | Hammad et al. |
| 2009/0121016 A1 | 5/2009 | Hammad et al. |
| 2009/0125396 A1 | 5/2009 | Otto et al. |
| 2009/0132347 A1 | 5/2009 | Anderson et al. |
| 2009/0132366 A1 | 5/2009 | Lam |
| 2009/0132395 A1 | 5/2009 | Lam et al. |
| 2009/0132404 A1 | 5/2009 | King et al. |
| 2009/0144122 A1 | 6/2009 | Ginsberg et al. |
| 2009/0144146 A1 | 6/2009 | Levine et al. |
| 2009/0144201 A1 | 6/2009 | Gierkink et al. |
| 2009/0150265 A1 | 6/2009 | Keld |
| 2009/0157511 A1 | 6/2009 | Spinnell |
| 2009/0157512 A1 | 6/2009 | King |
| 2009/0157531 A1 | 6/2009 | Bui |
| 2009/0171778 A1 | 7/2009 | Powell |
| 2009/0171844 A1 | 7/2009 | Olliphant et al. |
| 2009/0172551 A1 | 7/2009 | Kane |
| 2009/0172728 A1 | 7/2009 | Shkedi et al. |
| 2009/0173782 A1 | 7/2009 | Muscato |
| 2009/0182674 A1 | 7/2009 | Patel et al. |
| 2009/0182675 A1 | 7/2009 | Brody |
| 2009/0187462 A1 | 7/2009 | Gevelber et al. |
| 2009/0192882 A1 | 7/2009 | Narahashi |
| 2009/0204472 A1 | 8/2009 | Einhorn |
| 2009/0210347 A1 | 8/2009 | Sarcanin |
| 2009/0216579 A1 | 8/2009 | Zen et al. |
| 2009/0216606 A1 | 8/2009 | Coffman et al. |
| 2009/0216616 A1 | 8/2009 | Wang et al. |
| 2009/0216676 A1 | 8/2009 | Mathur et al. |
| 2009/0222323 A1 | 9/2009 | Kelly |
| 2009/0234708 A1 | 9/2009 | Heiser, II |
| 2009/0234711 A1 | 9/2009 | Ramer et al. |
| 2009/0234715 A1 | 9/2009 | Heiser, II |
| 2009/0234737 A1 | 9/2009 | Sarelson |
| 2009/0248496 A1 | 10/2009 | Hueter |
| 2009/0248497 A1 | 10/2009 | Hueter |
| 2009/0248511 A1 | 10/2009 | Mehta et al. |
| 2009/0249384 A1 | 10/2009 | Fang et al. |
| 2009/0254414 A1 | 10/2009 | Schwartz et al. |
| 2009/0254476 A1 | 10/2009 | Sharma |
| 2009/0259518 A1 | 10/2009 | Harvey et al. |
| 2009/0259547 A1 | 10/2009 | Clopp |
| 2009/0271305 A1 | 10/2009 | Lal et al. |
| 2009/0271327 A1 | 10/2009 | Lal |
| 2009/0276317 A1 | 11/2009 | Dixon et al. |
| 2009/0299846 A1 | 12/2009 | Brueggemann et al. |
| 2010/0030644 A1 | 2/2010 | Dhamodharan |
| 2010/0042517 A1 | 2/2010 | Paintin et al. |
| 2010/0049620 A1 | 2/2010 | Debow |
| 2010/0057549 A1 | 3/2010 | Boal |
| 2010/0057586 A1 | 3/2010 | Chow |
| 2010/0106568 A1 | 4/2010 | Grimes |
| 2010/0106569 A1 | 4/2010 | Grimes |
| 2010/0114677 A1 | 5/2010 | Carlson |
| 2010/0114683 A1 | 5/2010 | Wessels |
| 2010/0114686 A1 | 5/2010 | Carlson |
| 2010/0153242 A1 | 6/2010 | Preston |
| 2010/0161379 A1 | 6/2010 | Bene et al. |
| 2010/0174607 A1 | 7/2010 | Henkin et al. |
| 2010/0174623 A1 | 7/2010 | McPhie |
| 2010/0191594 A1 | 7/2010 | White et al. |
| 2010/0250338 A1 | 9/2010 | Banerjee |
| 2010/0274625 A1 | 10/2010 | Carlson |
| 2010/0274627 A1 | 10/2010 | Carlson |
| 2010/0280880 A1 | 11/2010 | Faith |
| 2010/0280881 A1 | 11/2010 | Faith |
| 2010/0280882 A1 | 11/2010 | Faith |
| 2010/0280927 A1 | 11/2010 | Faith |
| 2010/0280950 A1 | 11/2010 | Faith |
| 2010/0306029 A1 | 12/2010 | Jolley |
| 2010/0306032 A1 | 12/2010 | Jolley |
| 2010/0318801 A1 | 12/2010 | Roberge et al. |
| 2011/0016103 A1 | 1/2011 | Sivakumar et al. |
| 2011/0022424 A1 | 1/2011 | Von Derheide |
| 2011/0035278 A1 | 2/2011 | Fordyce, III |
| 2011/0035280 A1 | 2/2011 | Fordyce, III |
| 2011/0035288 A1 | 2/2011 | Clyne |
| 2011/0047072 A1 | 2/2011 | Ciurea |
| 2011/0087519 A1 | 4/2011 | Fordyce, III |
| 2011/0087530 A1 | 4/2011 | Fordyce, III |

(56) References Cited

U.S. PATENT DOCUMENTS

| | | |
|---|---|---|
| 2011/0087531 A1 | 4/2011 | Winters et al. |
| 2011/0087546 A1 | 4/2011 | Fordyce, III |
| 2011/0087547 A1 | 4/2011 | Amaro et al. |
| 2011/0087550 A1 | 4/2011 | Fordyce, III |
| 2011/0093324 A1 | 4/2011 | Fordyce, III et al. |
| 2011/0093327 A1 | 4/2011 | Fordyce, III et al. |
| 2011/0093335 A1 | 4/2011 | Fordyce, III et al. |
| 2011/0106607 A1 | 5/2011 | Alfonso et al. |
| 2011/0106840 A1 | 5/2011 | Barrett |
| 2011/0125565 A1 | 5/2011 | MacIlwaine et al. |
| 2011/0276383 A1 | 11/2011 | Heiser et al. |
| 2011/0288918 A1 | 11/2011 | Cervenka |
| 2011/0302022 A1 | 12/2011 | Fordyce, III |
| 2011/0302036 A1 | 12/2011 | Fordyce, III |
| 2011/0302039 A1 | 12/2011 | Fordyce, III |
| 2012/0109709 A1 | 5/2012 | Fordyce, III et al. |
| 2012/0109734 A1 | 5/2012 | Fordyce, III et al. |
| 2012/0185315 A1 | 7/2012 | Von Derheide et al. |
| 2012/0191525 A1 | 7/2012 | Singh |
| 2012/0215610 A1 | 8/2012 | Amaro et al. |

FOREIGN PATENT DOCUMENTS

| | | |
|---|---|---|
| JP | 2001175761 | 6/2001 |
| JP | 2003108897 | 4/2003 |
| JP | 2006301866 | 11/2006 |
| JP | 2007102340 | 4/2007 |
| JP | 2007317209 | 12/2007 |
| KR | 1020000037128 | 7/2000 |
| KR | 20020074271 | 9/2002 |
| KR | 20030080797 | 10/2003 |
| KR | 20040040253 | 5/2004 |
| KR | 20040107715 | 12/2004 |
| KR | 1020050024746 | 3/2005 |
| KR | 1020070043329 | 4/2005 |
| KR | 20050078135 | 8/2005 |
| KR | 20050089523 | 9/2005 |
| KR | 20060034983 | 4/2006 |
| KR | 20060061389 | 6/2006 |
| KR | 20060095895 | 9/2006 |
| KR | 20070030415 | 3/2007 |
| KR | 20070070588 | 7/2007 |
| KR | 20070075986 | 7/2007 |
| KR | 100761398 | 9/2007 |
| KR | 20080104398 | 12/2008 |
| KR | 100883700 | 2/2009 |
| KR | 1020090016353 | 2/2009 |
| KR | 1020090059922 | 6/2009 |
| WO | 9613814 | 5/1996 |
| WO | 9922328 | 5/1999 |
| WO | 9950775 | 10/1999 |
| WO | 0060435 | 10/2000 |
| WO | 0062231 | 10/2000 |
| WO | 0137183 | 5/2001 |
| WO | 0139023 | 5/2001 |
| WO | 0157758 | 8/2001 |
| WO | 0186378 | 11/2001 |
| WO | 0193161 | 12/2001 |
| WO | 0205116 | 1/2002 |
| WO | 0205224 | 1/2002 |
| WO | 0214985 | 2/2002 |
| WO | 0219229 | 3/2002 |
| WO | 0242970 | 5/2002 |
| WO | 02071187 | 9/2002 |
| WO | 03025695 | 3/2003 |
| WO | 03081376 | 10/2003 |
| WO | 2005001631 | 1/2005 |
| WO | 2005031513 | 4/2005 |
| WO | 2005076181 | 8/2005 |
| WO | 2006028739 | 3/2006 |
| WO | 2006126205 | 11/2006 |
| WO | 2007131258 | 11/2007 |
| WO | 2007136221 | 11/2007 |
| WO | 2008013945 | 1/2008 |
| WO | 2008023912 | 2/2008 |
| WO | 2008028154 | 3/2008 |
| WO | 2008052073 | 5/2008 |
| WO | 2008055217 | 5/2008 |
| WO | 2008064343 | 5/2008 |
| WO | 2008067543 | 6/2008 |
| WO | 2008121286 | 10/2008 |
| WO | 2008144643 | 11/2008 |
| WO | 2010141270 | 12/2010 |
| WO | 2011017613 | 2/2011 |
| WO | 2011044137 | 4/2011 |

OTHER PUBLICATIONS

Apr. 2003 Report of the Auditor General of Canada, Apr. 2003 Report—Chapter 2 (Post Pay).

Young, Lee W., Feb. 28, 2011 International Search with Written Opinion from PCT/US2010/054527 (13 pp.).

Pilon, Mary, "PayPal Makes a Bid for Student Banking", downloaded from http://blogs.wsj.com/digits/2009/08/14/paypal-makes-a-bid-for-student-banking/tab/article, 3 pp. (Aug. 14, 2009).

"Google ad words Tacking Codes" Measuring Your Profits, AdWords Help, Google Corporation, Book excerpt pp. 1-2. Available: http://support.google.com/adwords/bin/answer.py?hl=en&answer=2404207&from=146309&rd=1, Jun. 20, 2011.

"Loyalty Solutions—Issuing Rewards Services" 2008, First Data Corporation. Available at http://www.firstdata.com/downloads/marketing-fs/fd_issuingrewards_ss.pdf.

Carini, Robert, "Oracle's Complete Sell-Side E-Commerce Solution," Apr. 30, 2008, 20 pages, available at http://www.oracle.com/us/products/applications/siebel/self-service-ebilling/038547.pdf.

Cashmore, Pete, "YouTube Ads: YouHate Em," available at http://mashable.com/2009/04/05/youtube-ads-youhate-em/#, Apr. 5, 2009.

Georgiadis, Margo et al., "Smart data, smart decisions, smart profits: the retailer's advantage," 22 pages, Feb. 8, 2005. Available at http://web.archive.org/web/20050208141921/http://www.mckinsey.com/practices/retail/knowledge/articles/smartdatasmartdecisions.pdf.

International Patent Application PCT/US2011/037769, International Search Report and Written Opinion, Jan. 9, 2012.

International Patent Application PCT/US12/22417, International Search Report and Written Opinion, Aug. 9, 2012.

International Patent Application PCT/US2009/052766, International Search Report and Written Opinion, Mar. 11, 2010.

International Patent Application PCT/US2010/036076, International Search Report & Written Opinion, Dec. 30, 2010.

International Patent Application PCT/US2010/043440, International Search Report and Written Opinion, Feb. 24, 2011.

International Patent Application PCT/US2010/044449, International Search Report and Written Opinion, Mar. 14, 2011.

International Patent Application PCT/US2010/044459, International Search Report and Written Opinion, Mar. 28, 2011.

International Patent Application PCT/US2010/044706, International Search Report and Written Opinion, Mar. 25, 2011.

International Patent Application PCT/US2010/044779, International Search Report and Written Opinion, Mar. 31, 2011.

International Patent Application PCT/US2010/044786, International Seach Report and Written Opinion, Mar. 17, 2011.

International Patent Application PCT/US2010/045082, International Search Report and Written Opinion, Feb. 28, 2011.

International Patent Application PCT/US2010/050504, International Seach Report and Written Opinion, Apr. 21, 2011.

International Patent Application PCT/US2010/050923, International Seach Report and Written Opinion, Apr. 26, 2011.

International Patent Application PCT/US2010/051262, International Seach Report and Written Opinion, May 30, 2011.

International Patent Application PCT/US2010/051490, International Seach Report and Written Opinion, Apr. 21, 2011.

International Patent Application PCT/US2010/051853, International Seach Report and Written Opinion, Jun. 21, 2011.

International Patent Application PCT/US2010/052070, International Search Report and Written Opinion, May 31, 2011.

International Patent Application PCT/US2010/053061, International Search Report and Written Opinion, May 30, 2011.

(56) References Cited

OTHER PUBLICATIONS

Punj, Girish et al. "Cluster Analysis in Marketing Research: Review and Suggestions for Application," Journal of Marketing Research, vol. 20, pp. 134-148, May 1983.

Van Grove, Jennifer, "Are Your Online Video Ads Driving Actual Offline Purchases?", available at http://mashable.com/2009/05/18/video-impact/#, May 18, 2009.

Google ad words Tracking Codes"—Measuring Your Profits, AdWords Help. Google Corporation—Book Excerpt, pp. 1-2. Retrieved from the Internet by Third Party Jun. 20, 2011: <URL: href="http://adwords.google.com/supportlawlbin/answer.py?hl=en& answer=146309.

International Patent Application PCT/US2012/034283, International Search Report and Written Opinion, Nov. 1, 2012.

\* cited by examiner

SYSTEM AND METHOD FOR PROMOTION PROCESSING AND AUTHORIZATION

CROSS-REFERENCE TO RELATED APPLICATION

This application claims the benefit of priority from U.S. Provisional Application No. 61/256,143, filed on Oct. 29, 2009. This prior application, including the entire written description and drawing figures, is hereby incorporated into the present application by reference.

TECHNICAL FIELD

The present disclosure relates generally to computer-implemented systems and methods for electronic commerce for promotion processing and authorization.

BACKGROUND AND SUMMARY

Electronic commerce, commonly known as electronic marketing, e-commerce, or eCommerce, consists of the buying and selling of products or services over electronic systems such as the Internet and other computer networks. The amount of trade conducted electronically has grown extraordinarily with widespread Internet usage. Commerce conducted in this manner utilizes a complex web of innovations in electronic funds transfer, supply chain management, Internet marketing, online transaction processing, electronic data interchange (EDI), inventory management systems, automated data collection systems, and many others. Modern electronic commerce typically uses the World Wide Web at least at some point in the transaction's lifecycle, although it can encompass a wider range of technologies such as e-mail as well.

With the continued increase in competition on the web, product, content, and service providers must strive to not only produce the best products, content, and services, but they must also compete to offer the most intuitive, secure, and fast mechanisms for accepting payments and providing their wares to interested consumers. The systems and methods disclosed herein offer enhanced capabilities for providing targeted promotions and transaction authorizations for individual merchant/payees, consumers/payers, and groups of the same.

In a funds facilitation system that facilitates transactions between a payer and a payee, a computer-implemented promotion processing system for generating and processing promotion rules for a promotion in the funds facilitation system, includes: a user interface configured to: receive promotion data, the promotion data comprising a promotion identification and a payee identification. The user interface is configured to associate the promotion identification with the payee identification. Additionally, a promotion processor is configured to generate the promotion rule from the promotion identification with the payee identification; receive transaction data identifying the payee and the payer, and to compare the transaction data with the promotion rules stored in the database to identify the promotion rule associated with the payee identification; and apply the promotion rule to the transaction data.

A computer-implemented method for processing promotions in a funds facilitation system that facilitates transaction between a payer and payee includes the steps of: receiving promotion data, the promotion data comprising a promotion identification and a payee identification; associating the promotion identification with the payee identification; generating a promotion rule based on the associated promotion identification and payee identification; storing the promotion rule in a promotion rules database; receiving at a promotion processor transaction data identifying the payee and the payer; and comparing the transaction data to the promotion rules stored in the database to identify the promotion rule associated with the payee identification; and applying the promotion rule to the transaction data. The receiving, generating, associating, storing, comparing, and applying steps are performed by software executable on one or more data processors.

In a funds facilitation system that facilitates transactions between a payer and a payee, a display device for displaying a user interface for determining rules and parameters for a promotion in the funds facilitation system comprises: a rule field for entering a promotion identification, the promotion identification identifying a type of promotion; a parameter field for entering a parameter that places a condition on the promotion; an account ID field for entering an account ID of the payee; wherein the promotion is applied to purchases made from the payee, and the condition on the promotion rule identifies a payer to receive the promotion.

In a funds facilitation system that facilitates transactions between a payer and a payee, a computer-implemented method for processing transactions in a funds facilitation system includes the steps of receiving age information associated with a payer; receiving an electronic transaction authorization request from a payee, the electronic transaction authorization request including information associated with an age-based condition; comparing the age information associated with the payer to the age-based condition; processing the transaction based upon whether the age information associated with the payer meets the age-based condition;
the receiving age information, receiving the electronic transaction authorization request, comparing, and processing steps being performed by software executable on one or more data processors.

In a funds facilitation system that facilitates transactions between a payer and a payee, a display device for displaying a promotion and gift code user interface for a funds facilitation system includes: a presentation of an unused gift code or promotion code associated with a payer user account on the funds facilitation system; a presentation of a link to a payee website associated with the gift code or promotion code.

In a funds facilitation system that facilitates transactions between a payer and a payee, a computer-implemented method for processing transactions in a funds facilitation system includes the steps of: receiving account data associated with a payer; receiving an electronic transaction authorization request from a payee, the electronic transaction authorization request including information associated with a condition; comparing the account data associated with the payer to the condition; and authorizing and processing the transaction based upon whether the account data associated with the payer meets the condition. The receiving account data, receiving the electronic transaction authorization request, comparing, and authorizing and processing steps are performed by software executable on one or more data processors.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

For the present disclosure to be easily understood and readily practiced, the present disclosure will now be described, for purposes of illustration and not limitation, in conjunction with the following figures.

Like reference numbers and designations in the various drawings indicate like elements.

DETAILED DESCRIPTION

An example funds facilitation system that facilitates transactions between a payer and payee includes a promotion processing system that facilitates the provision of promotions to account holders on the funds facilitation system. The party offering the promotion may be a merchant/payee that also has an account with the funds facilitation system. (The term "payee" includes not only persons that receive payment directly from the payer, but includes promoters or sponsors, which are discussed below). The promotion processing system applies promotion rules based on the identity of the merchant/payee and upon conditions placed on the promotion that identify a payer or a group of payers to receive the promotion. A user interface is provided for generating promotion rules and monitoring promotions. A user interface is also provided that displays unused promotion and gift codes and links to merchant/payee websites associated with the unused codes. The funds facilitation system can also provide authorization for purchases based on a condition, such as the age of the payer.

Figure 1:
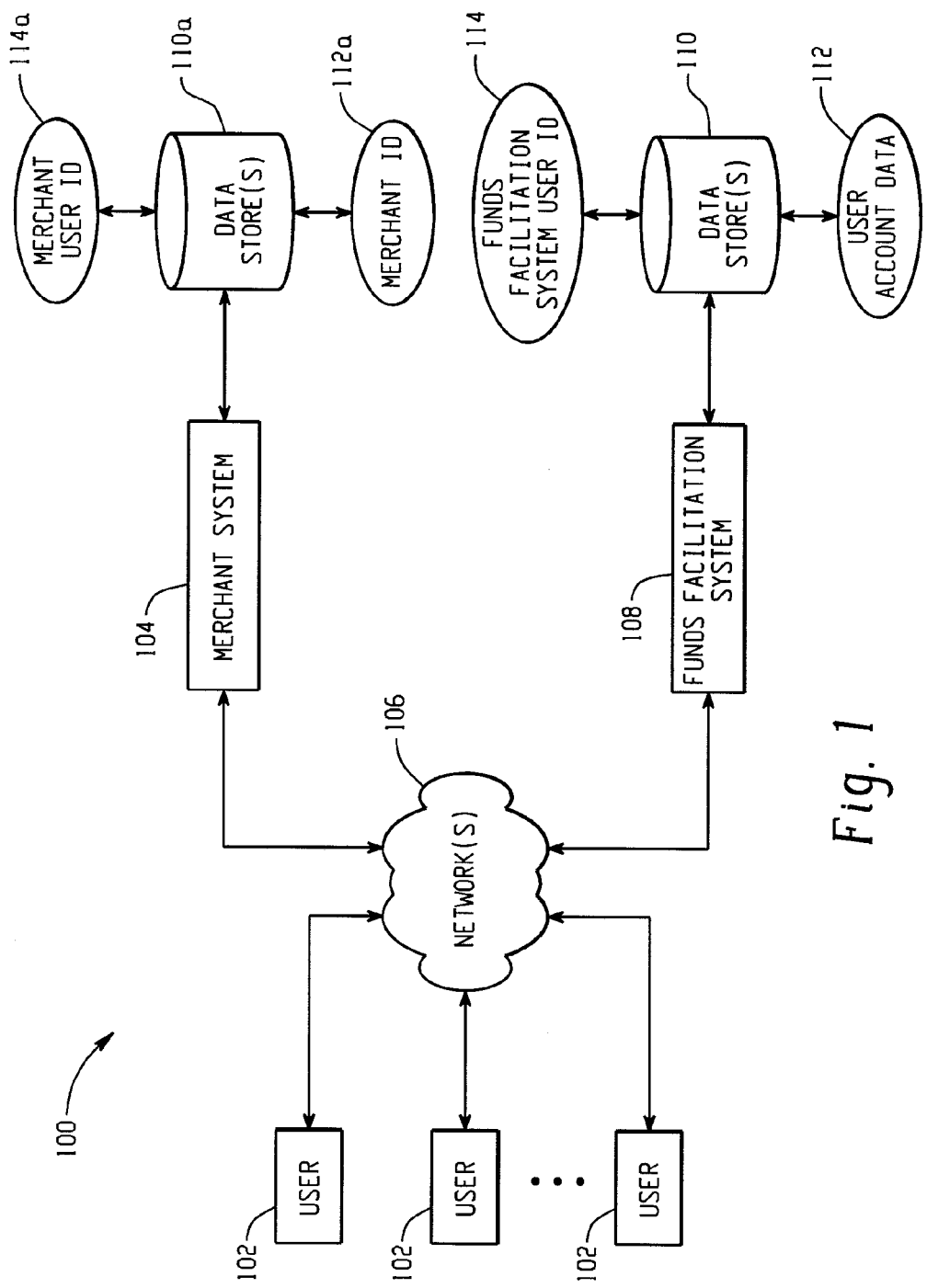
FIG. 1 depicts a computer-implemented environment wherein users can interact with a merchant system and a funds facilitation system hosted on one or more servers through a network.

FIG. 1 depicts at 100 a computer-implemented environment wherein users 102 can interact with a merchant system 104 hosted on one or more servers through a network 106. The merchant system 104 contains software operations or routines for receiving a transaction request from a user 102 and providing fulfillment or notice of fulfillment of the requested transaction or a denial of the transaction request to the user 102. The users 102 can interact with the merchant system 104 in a number of ways, such as over one or more networks 106. One or more servers accessible through the network(s) 106 can host the merchant system 104.

The computer-implemented environment further includes a funds facilitation system 108. The funds facilitation system 108 may be configured for identifying the availability of funds in a user account, acquiring funding for a user account, disbursing funding to a merchant to pay for a transaction, providing promotions to payees, and authorizing a transaction between a merchant and a payee, as well as other operations. Both payers and merchant/payees have user accounts with the funds facilitation system 108. The funds facilitation system 108 is hosted on one or more servers through one or more networks 106.

In an example operation, a payer user 102 accesses a web page hosted on the merchant system 104 via the one or more networks 106. For example, the web page may list a number of book titles that are available for download from the merchant system 104 in exchange for a payment from the payer user 102. The payer user 102 indicates his desire to download one of the listed books by clicking a button on the web page that initiates a transaction request to the merchant system 104.

Upon receipt of the transaction request, the merchant system 104 prepares a transaction authorization request for authorization of the transaction and facilitating payment for the transaction. The merchant system 104 may access one or more data stores 110a to acquire a merchant ID 112a identifying the merchant system 104. The merchant system 104 may further access the one or more data stores 110a to access a merchant payer user ID 114a associated with the payer user 102 that provided the transaction request. The merchant payer user ID 114a associated with the payer user 102 may be identified based on a prior user identification at the merchant system 104, such as the payer user 102a providing a username and password combination. The merchant system 104 packages the merchant ID 112a, the merchant payer user ID 114a, as well as a transaction amount associated with the transaction requested by the payer user 102 into a transaction authorization request that is transmitted to the funds facilitation system 108 via the one or more networks 106.

The funds facilitation system 108 receives the transaction authorization request from the merchant system 104 and accesses one or more data stores 110 responsive to the funds facilitation system 108 to identify the funds facilitation system user IDs 114 associated with the merchant ID 112a and the merchant payer user ID 114a included in the transaction authorization request. The funds facilitation system user ID 114 accessed by the funds facilitation system 108 provides a link to user account data 112 for the merchant/payee and payer user 102 that provided the transaction request. The user account data 112 may include data related to one or more accounts related to the payer-user 102 including prepaid accounts, stored value accounts, credit accounts, debit accounts, or the like. In one embodiment, the stored value accounts may be useful for conducting low value transactions. In another embodiment, the account may be a credit, debit, or other account, or an alias for such an account, that may be more appropriate for higher value transactions. The merchant/payee account data 112 may include account data for providing payment and charging the merchant/payee.

The funds facilitation system 108 may determine the viability of the transaction described in the transaction authorization request from the merchant system 104 based on the provided transaction amount, a funds available value from the payer user account data 112, as well as other user account settings and data and other criteria.

If the funds facilitation system 108 determines that the proper criteria for a transaction approval are met, the funds facilitation system 108 may transfer the transaction amount from the user's account to the merchant and provide a transaction authorization to the merchant system 104. Upon receipt of a transaction authorization from the funds facilitation system 108, the merchant system 104 may make the book title available for immediate download by the user 102 with the knowledge that compensation for the transaction has been provided to the merchant.

While the above example describes providing a digital book to a user 102 in response to a transaction request, the system 100 may be utilized in a multitude of other scenarios. For example, instead of providing immediate digital content, the merchant may instead mail a physical product to the user 102 or perform a service, such as a healthcare service, for the user 102 upon receipt of a transaction authorization.

The funds facilitation system 108 may comprise one or more servers containing software operations or routines for creating and maintaining accounts for the users; for enabling the users to conduct transactions with one or more websites; for enabling users to initiate dispute proceedings with one or more websites and to automate the communications related to the dispute and the resolution of the dispute; to initiate and transmit alerts to users, websites, and or system administrators based upon pre-defined and/or customizable parameters; to configure and apply fees to transactions; and to conduct reporting as may be relevant to the websites, the account processor and/or the users.

Furthermore, the one or more servers of the account processor may additionally contain software operations or routines related to managing the accounts (such as by updating billing addresses, delivery addresses, user preferences, and the like); for enabling users to authorize and manage recurring payments or to pre-authorize payments; for enabling users to pre-authorize or prohibit (i.e., blacklist) websites and/or transactions; and/or for enabling users to manage accounts and conduct transactions using mobile electronic devices or any other electronic device such as internet-connected gaming consoles, a digital set-top box, or similar devices. A user 102 can register with the funds facilitation system 108, such as by registering with a particular account in order to receive a promotion affiliated with that account.

Figures 2, 3:
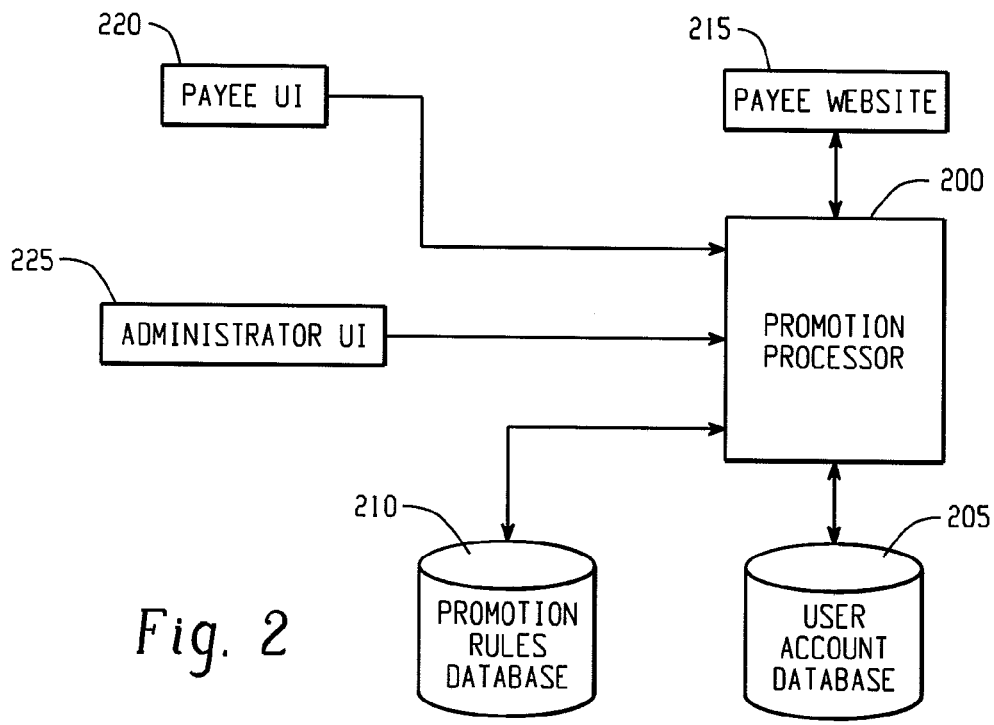
FIG. 2 shows an example promotion processing system.
FIG. 3 shows an example interface for generating and managing promotion rules.

FIG. 2 shows an example promotion processor 200 that is part of the funds facilitation system 108. The promotion processor 200 receives data from the data stores 110. In this example, the data stores 110 include a user account database 205 that stores user account and demographic information, and a promotion rules database 210 that stores promotion rules. The promotion processor 200 may also receive data from one or more merchant systems 104 through the network 106. In this example the merchant system is a payee website 215. The promotion processor 200 receives input defining and associating a promotion, a payee, and a condition from either or both of the payee user interface 220 and the administrator user interface 225. The user interface is provided on a display device. The administrator user interface may also receive input to define a price to charge the payee for the promotion. The promotion processor 200 processes the data it receives and facilitates a variety of promotion functionalities.

In an example funds facilitation system 108, the system can access payer profile data 112 and take action based upon one or more profile data values corresponding to one or more conditions. In these implementations, promotions can be based upon data corresponding to the one or more conditions. In an example implementation of the system, the promotion processor 200 generates promotion rules in response to the input received from the user interfaces 220, 225. It then stores the promotion rules in the promotion rules database 210. The promotion processor is configured to receive transaction data identifying the payee and the payer, and compares the transaction data with the promotion rules stored in the promotion rules database 210 to identify the promotion rule or rules associated with the payee identification and any additional conditions. The promotion processor 200 applies the promotion rule to the transaction data. The promotion processor then delivers any promotions to the payer. For example, delivering the promotion may include electronically sending a notification to the payer directly or through the payee, or it may include automatically applying the discount as part of the funds facilitation process. The promotion may be for the current transaction or a future transaction or may be a benefit not related to a transaction.

In some implementations, the funds facilitation system 108 can randomly and securely generate and apply rules to track promotion codes.

The funds facilitation system 108 can assign one or more promotion types. Due at least in part to the example system structure described in FIG. 1 and the example funds facilitation system 108 described herein, the system administrator or merchant/payee has a variety of options for generating and placing conditions (or parameters) on the promotions. For example, conditions for delivering, activating, deactivating, and customizing promotions can be established. The one or more promotions or promotion codes can be valid at a specific merchant, a specific list of merchants, a specific group of merchants (e.g., based on a set of common attribute(s) like a merchant category type), or all merchants. The promotion can even be tied to no merchants by being tied to an activity other than a purchase.

An example promotion can be a specific dollar value off of a purchase. The promotion can be a specific percentage discount value off of a purchase. The promotion code can be associated with a specific product ID, such as when the promotion code is used to receive a special price on a specific product. In these implementations, the specific product ID may signify that the product is only available with the promotion code. Alternatively, a promotion code can be a specific non-purchase value (e.g., an entry into a drawing or a competition).

In some examples, the funds facilitation system 108 can condition promotion validity or availability to all payer account holders, a specific account holder, a specific list of payer account holders, or a specific group of payer account holders defined by a common piece of data. For example, promotion availability/validity can be restricted based upon a common condition or set of conditions that are met in a payer's user account profile that is stored in the user account database 205. For example, the availability of the promotion may be conditioned upon a demographic indicator, state(s), postal code(s), age, account type, or account level. Additionally, promotion code availability/validity can be restricted based upon transaction history, such as transaction(s) conducted of a certain type or value, or at a specific merchant, group of merchants, or in general, over a specified date range. For example, a promotion code can be valid for all account holders who have made more than three purchases at Merchant X, Y and/or Z between Feb. 1, 2011 and Feb. 28, 2011.

Alternatively, or in addition to controlling promotion code validity as described above, the presentation and advertisement of promotional codes may also be controlled by the funds facilitation system 108.

An example funds facilitation system 108 can also set conditions or parameters on a promotion, for example, by using non-overlapping ranges, such as by awarding a different discount value depending upon the dollar value of the purchase being made. For example, if a user spends more than $5.00 (e.g., $5.01-$10.00), they get a $1.00 discount, and if a user spends more than $10.00 (e.g., $10.01 or more), they get a $3.00 discount. In another example, the percentage discount can be different depending on the dollar value of the purchase being made. For example, if a user spends up to $10.00 ($0.01-$10.00), they receive a 5 percent discount, if a user spends from $10.01 to $20.00, they receive a 10% discount, and if a user spends $20.01 or more, they receive a 15% discount.

In another example, a special price on a specific product can be applied only when the condition is met that another specific product is bought in the same purchase. For example, if a user buys product X, they receive product Y free, or at half-price.

In yet another example, the promotion may encompass a drawing instead of a discount. The number of entries in the drawing could be variable based upon an event or a value associated with an event that triggers the issuance of the promotion. For example, a user can spend $0.01-$5.00 for one free entry, $5.01-$10.00 for three entries, and $10.01 or more for five entries.

The funds facilitation system 108 may set activation and expiration date and time conditions for a promotion. In a related function, the funds facilitation system 108 can expire a promotion code early or extend the expiration date/time of a promotion code.

In some implementations, the funds facilitation system 108 can set universal conditions or parameters on a promotion to limit the use of the promotion. For example, a universal parameter can be based upon the total number of times the promotion code has been used. In one embodiment, the promotion is valid for the first 500 customers' uses only. In another example, a universal parameter can be based upon the total value of a promotion redemption, such as, when the total value of the redemption exceeds $10,000, the promotion is deactivated.

The universal parameters may also be applied to a group of promotions. For example, when there is more than one offer (e.g., three offers) available, all offers can cease to be valid when the total number of redemptions or a total value of the redemptions with respect to all three offers is reached or exceeded.

The funds facilitation system 108 may, for example, issue promotions to account holders based on a trigger event. For example, a trigger event can occur when the existing account attributes meet one or more of the defined parameters noted above, such as purchasing a certain amount. A trigger event can occur as a result of a specific purchase. A trigger event may also occur as a result of a specific user-initiated account activity such as inviting friends, a successful friend referral, a set-up of regular account top-ups, the addition of a specific card type to funding options, the setting of a specific card type as default, or the setting up of a sponsored account. In yet another example, a trigger event can occur as a result of a passive user "event," such as the user's birthday or the length of time an account has been open and/or active.

The promotion processor 200 as a part of the funds facilitation system 108 can deliver promotions through a variety of vehicles. For example, a promotion can be delivered in a transaction response message to a merchant/payee that the merchant can display to the purchaser on a transaction successful screen. In this example, the promotion does not need to be an offer from the merchant/payee sending the transaction response message. For example, the promotion can be a cross-promotion from another merchant. In another example, a promotion code can be delivered in an email to an account holder(s). Alternatively, the promotion code can be presented in a graphical user interface of the funds facilitation website or in the payee website. In one example, the email can be automatically sent following a trigger event. In yet another example, a promotion code can be delivered using an out-of-service vehicle (e.g., in an advertisement by a merchant or the funds facilitation system operator).

The example promotion processor 200 as a part of the funds facilitation system 108 can facilitate promotion redemption 211 in multiple scenarios. For example, a promotion code can be entered manually (e.g., by a user on a transaction authorization screen in a merchant/payee website and passed in a transaction request message, or by an account holder on an account page where an activity is being authorized with a password. In another example, a promotion code can be entered automatically (e.g., by a merchant/payee website as part of the transaction request message). In yet another example, a promotion code is not entered at all, but is applied automatically by the funds facilitation system 108. For example, when a promotion code benefit is automatically triggered at the occurrence of a condition, such as a trigger event (e.g., when a payer spends more than $20.00 at merchant X in February, then $2.00 will be discounted from the price, or in another example, donated to charity Y). In this example, a confirmation message can be sent to the user upon the occurrence of the condition and associated promotion benefit.

Figure 4:
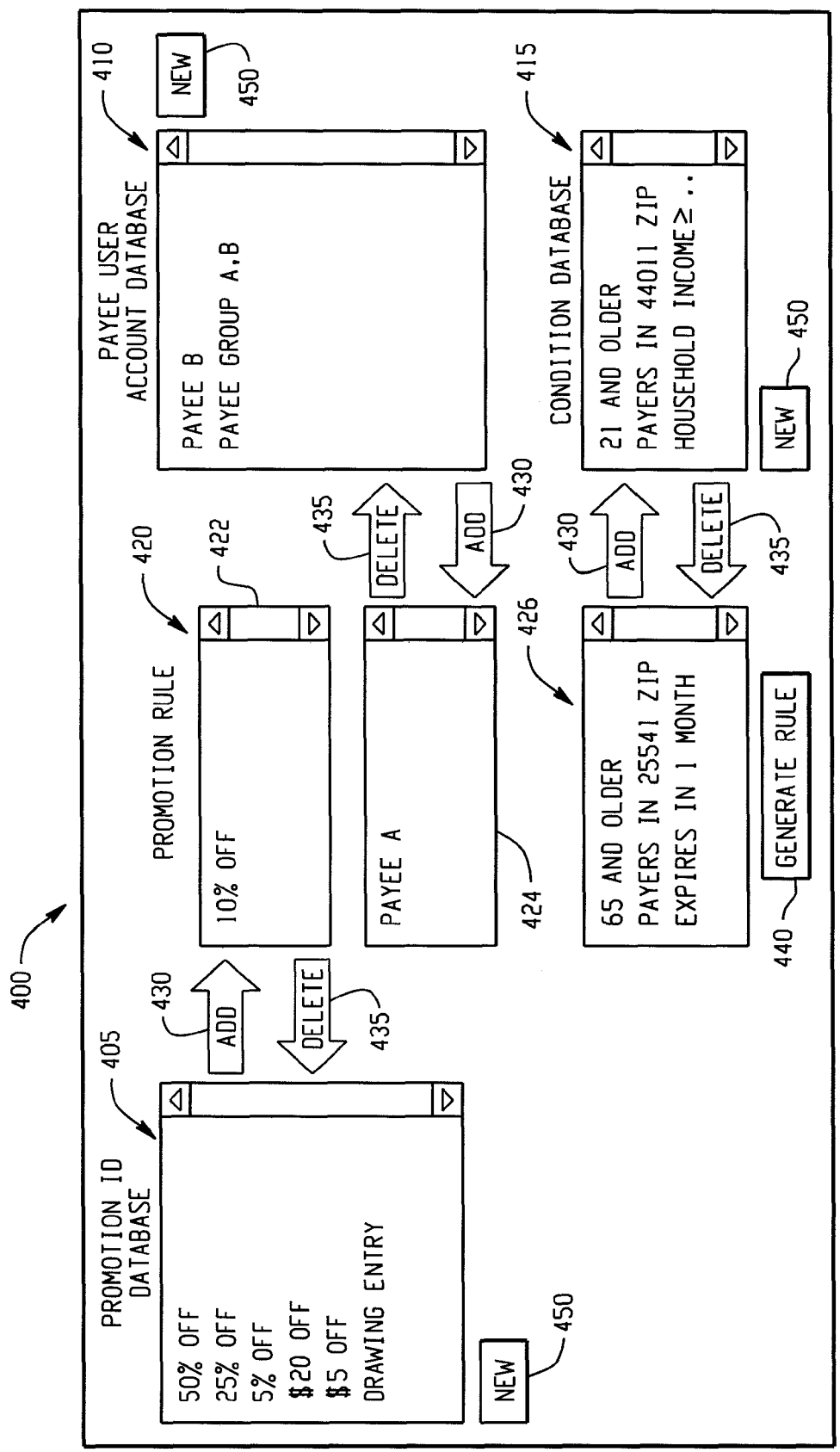
FIG. 4 shows a second example interface for generating and managing promotion rules.

The promotions and conditions can be input and managed using a user interface, such as the example graphic user interfaces shown in FIGS. 3 and 4. In an alternative example, the promotions and conditions can be managed through a server call.

FIG. 3 shows an example interface 300 for generating and managing promotion codes. The interface is provided on a display device. Example interface 300 can be an administrative interface that can facilitate the generation 301 and configuration of promotion rules. In this example, drop down menus present a number of possible selections. The interface 300 can also be used to subsequently modify 304 a promotion 302 or a condition 303 for an existing promotion rule. For example, an existing promotion rule can be selected in a previous user interface, which then opens the example interface 300 with the fields pre-filled with the existing promotion rule data. Similarly, the promotion could be configured and edited using a reference ID via specifically formatted messages communicated via server calls.

The example interface 300 can be used to designate a payee Account ID in an Account ID field 306 which can be used to manage a promotion code or group of promotion codes. A specific merchant/payee Account ID can be designated for a specific merchant promotion, or multiple Account IDs can be specified for a group merchant promotion. In this case, the promotion rule will associate the selected promotion with the selected Account IDs. In one example, ownership can be assigned to a specific group account, and then access permissions can be provided to that group account for use by all group participants. In some implementations, the Account ID field 306 may have an operator input to designate a specific promotion run by the funds facilitation system rather than a payee Account ID.

In one example, the user interface provides the ability to create an Account ID only for the purpose of managing a promotion code or group of promotion codes. For example, a third-party "promoter" who is not an account holder on the funds facilitation system may have an account opened solely for the purpose of managing promotions. For example, a sponsor or affiliate of a merchant may run a promotion to give account holders a free download or discount from the merchant's website.

For example, a third-party who is not an account holder (e.g., a third-party bank that is a sponsor of an event), can run a promotion to give bank account holders a free download from a sponsored event website or a discount on any purchase of merchandise from the sponsored website. Thus, even though the event organizers are a merchant/payee, the promotion is controlled by the third-party bank, not the event organizers.

The example interface 300 can be used to charge fees to one or more accounts. Fees can be fixed and/or percentage based. Fees can be applied to the issuance of a promotion rule with pricing parameters 305. Pricing parameters 305 can be based upon, for example, date range of validity, value of offer, or volume/size of payee/merchant(s). For example, a different fee can be charged to each participating merchant(s) depending on a parameter such as sales volume. In some implementations, a fee can be charged in addition to or in lieu of a standard transaction fee, for each use of the promotion. In some implementations, a fee can be charged for each change to promotion code configuration (e.g. early expiration, extension of validity, or a change to valid account parameters). The fee may be charged at the generation of the promotion rule, or when the promotion is delivered to the payer.

Although drop-down menus are indicated in FIG. 3, more than one entry may be made for each of the promotion 302, condition 303, Account ID 306, and Pricing 305 fields. In some examples, a separate operator may be input to determine if multiple entered conditions, such as A and B, are to be processed as requiring both A and B, or requiring either A or B.

FIG. 4 shows a second example user interface 400 for assigning promotion codes, which may be more easily utilized to assign multiple promotions, account IDs, and conditions, for generating a promotion rule than the example of FIG. 3. The user interface is provided on a display device. Furthermore, this user interface excludes the pricing input, so it may be more appropriate for use by a payee/merchant.

In the example user interface of FIG. 4, three columns are displayed. At one side of the user interface 400, a listing of promotions is shown in a column titled "Promotion ID Database" 405. At the opposite side thereof, another column titled "Payee User Account Database" 410 contains a listing of possible Payee Accounts that may be selected. In the same column, a separate row, beneath the "Payee User Account Database," includes a number of conditions that are listed under the heading "Conditions Database" 415. In the middle column, titled "Promotion Rule" 420, a promotion field 422, an account ID field 424, and a condition field 426 are presented.

To populate each of the promotion field 422, account ID field 424, and condition field 426, the user may select one or more promotions from the promotion ID database 405, payee user account database 410, and condition database 415, and input the selection into the respective promotion rule field, by clicking (or otherwise activating) the respective "Add" arrow 430 pointing to the respective field of the promotion rule column. Items input to the promotion rule column 420 may be deselected and sent back to the respective field by clicking (or otherwise activating) the respective "Delete" arrow 435 pointing away from the promotion rule field. In this way a promotion rule for the desired payee user account and conditions is associated with the desired promotion. The promotion rule is generated and stored in a promotion rules database by clicking (or otherwise activating) the "Generate Rule" button 440, at the bottom of the promotion rule column 420.

A "New" button 450 corresponding to each of the promotion database, payee user account database, and condition database is provided in case the user does not see a desired promotion, payee user account, or condition in the listings of selectable items. Clicking (or otherwise activating) the "New" button 450 may cause a message window to be opened wherein the user can draft a request for the new item and send it to an administrator for creation. Alternatively, activation of the "New" button may directly open an interface for creating new items for the promotion database, payee user account database, and condition database.

In some implementations, either the example interface 300 of FIG. 3 or the example interface 400 of FIG. 4 can further be used to monitor promotion issuance and usage and to generate usage reports. For example, a previously generated promotion rule may be selected and a pop-up screen may show usage statistics, which may indicate that a promotion code is being passed around to more users than the payee intended. Thus, the interface 300 may function to modify the rule based on one or more conditions 303, such as limiting the times the promotion or promotion code may be used or the total amount of discount or drawing entries that are available, after which the promotion or promotion code will cease to be valid.

In some implementations, an interface can be used to provide one-time use promotions, such as a gift card, to a merchant/payee. In these implementations, a merchant/payee can configure and sell one-time use promotion codes (e.g., in the form of "gift codes"), to standard account holders from any enrolled merchant/payee account, or directly from the fund facilitation system 108 using the interface. A seller can set a face value for a gift code that is different than the purchase price. For example, a seller can allow a user to buy a discounted $20.00 gift code for $18.00. Alternately, a seller can attach a $2.00 purchase fee to a $20.00 gift code, causing the user to pay $22.00.

For example, a user can purchase one-time use promotion codes in the form of gift codes for themselves or for another user, for example for use at a merchant website that has an account with the funds facilitation system 108.

Figure 5:
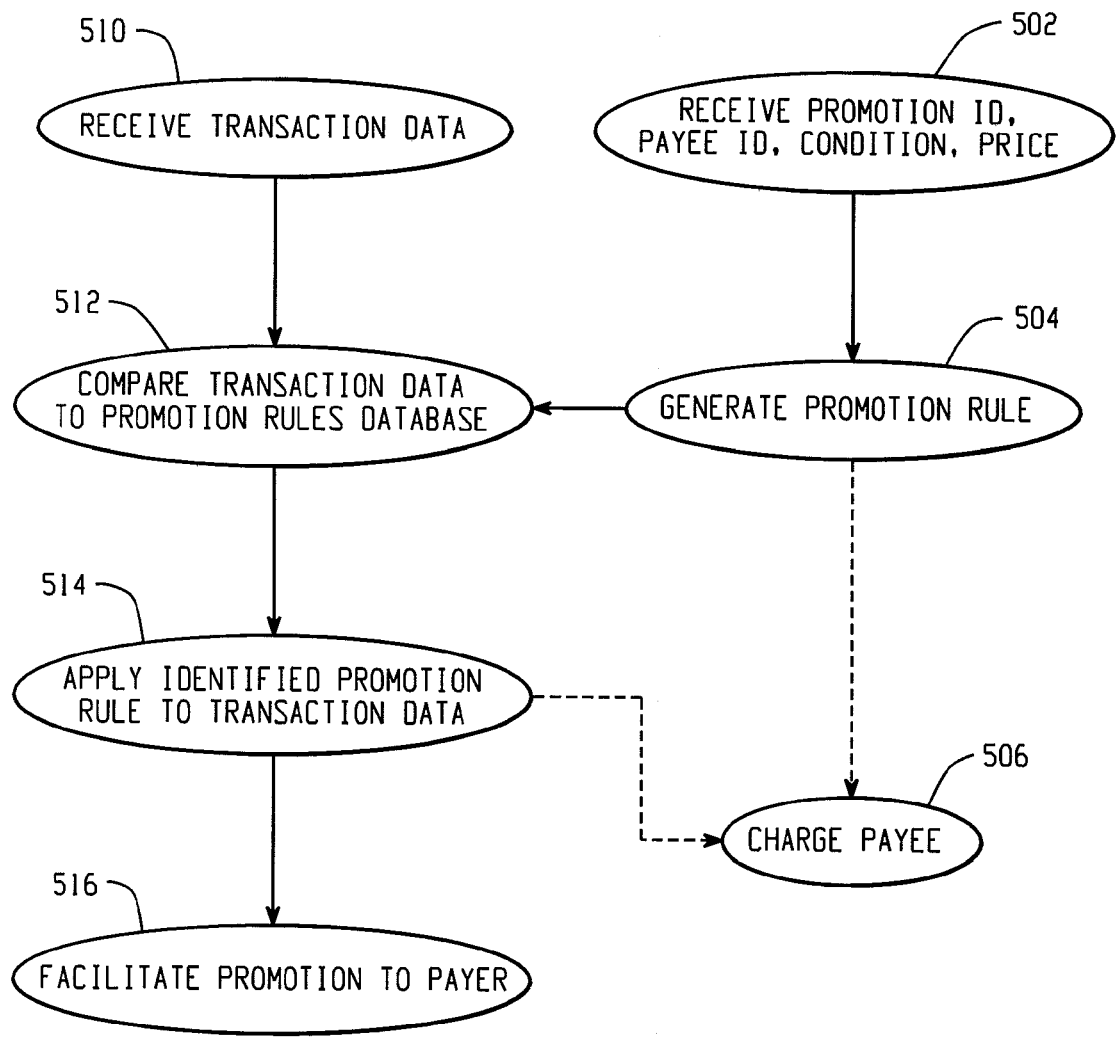
FIG. 5 is an example flow-chart for processing promotions in a funds facilitation system.

FIG. 5 shows an example flow chart of a computer-implemented method for processing promotions in a funds facilitation system 108 that facilitates a transaction between a payer and payee. In this example, promotion data comprising a promotion ID, payee ID, condition, and price are input in a user interface 502, and a promotion rule is generated 504 based on the input from the user interface 502. The promotion rule is stored in a promotion rules database. Optionally, the payee is charged according to the price of the promotion rule 506 shortly after the promotion rule is generated.

Transaction data is received 510 by a promotion processor operating on the funds facilitation system, for example, subsequent to a transaction request from the payee's website. The transaction data identifies the payee and payer and the transaction amount. Further information may also be provided, such as information regarding an item that is being purchased or a request to apply a condition before providing the promotion. The promotion processor then compares the transaction data to the promotion rules stored in the database 512 to identify the applicable promotion rule associated with the payee identification and any conditions. The one or more identified promotion rules are then applied to the transaction data 514. Again there is the option of charging the payee for the promotion 506 at this point, when the promotion is applied to a transaction. In one embodiment the payee may be charged both when the rule is generated and when it is applied.

Once the promotion rule is applied, the promotion is delivered to the payer. Delivering the promotion to the payer may, for example, include automatically applying a discount to the transaction, informing the payer of a promotion code to be used on a later transaction, or informing the payer of an entry in a drawing being held concurrently or at a future time. Each step of the example method is performed by software executable on one or more data processors.

The funds facilitation system 108 can additionally approve or decline the transaction (e.g., based upon whether the purchaser meets conditions set by a seller).

In an example transaction authorization system, the fund facilitation system 108 will provide information to a seller and approve or decline transactions based upon seller instructions (e.g., as reflected in age criteria). In these implementations, a privacy policy may indicate that the provision of age-related information to a seller is for a particular purpose. In one example, the user may not opt out of including this information (e.g., it will be a part of the standard terms and conditions for use of the service). Additionally, age indicator response data will be provided to a seller with a disclaimer. For example, the disclaimer can include language indicating that the fund facilitation system 108 holds no liability for the accuracy of age or other demographic-related information. Additionally, the disclaimer may state that the fund facilitation system 108 is providing the parameter-related information to the seller for information purposes only. Moreover, it may also state that decisions made based on condition-based information will be at the exclusive direction of the seller. In some examples, an additional field can be added to the transaction data in the purchase authorization request message. A merchant/payee can optionally use the purchase authorization request message to indicate an instruction (e.g., to apply a specific age-based condition to the approval of a purchase).

Figure 6:
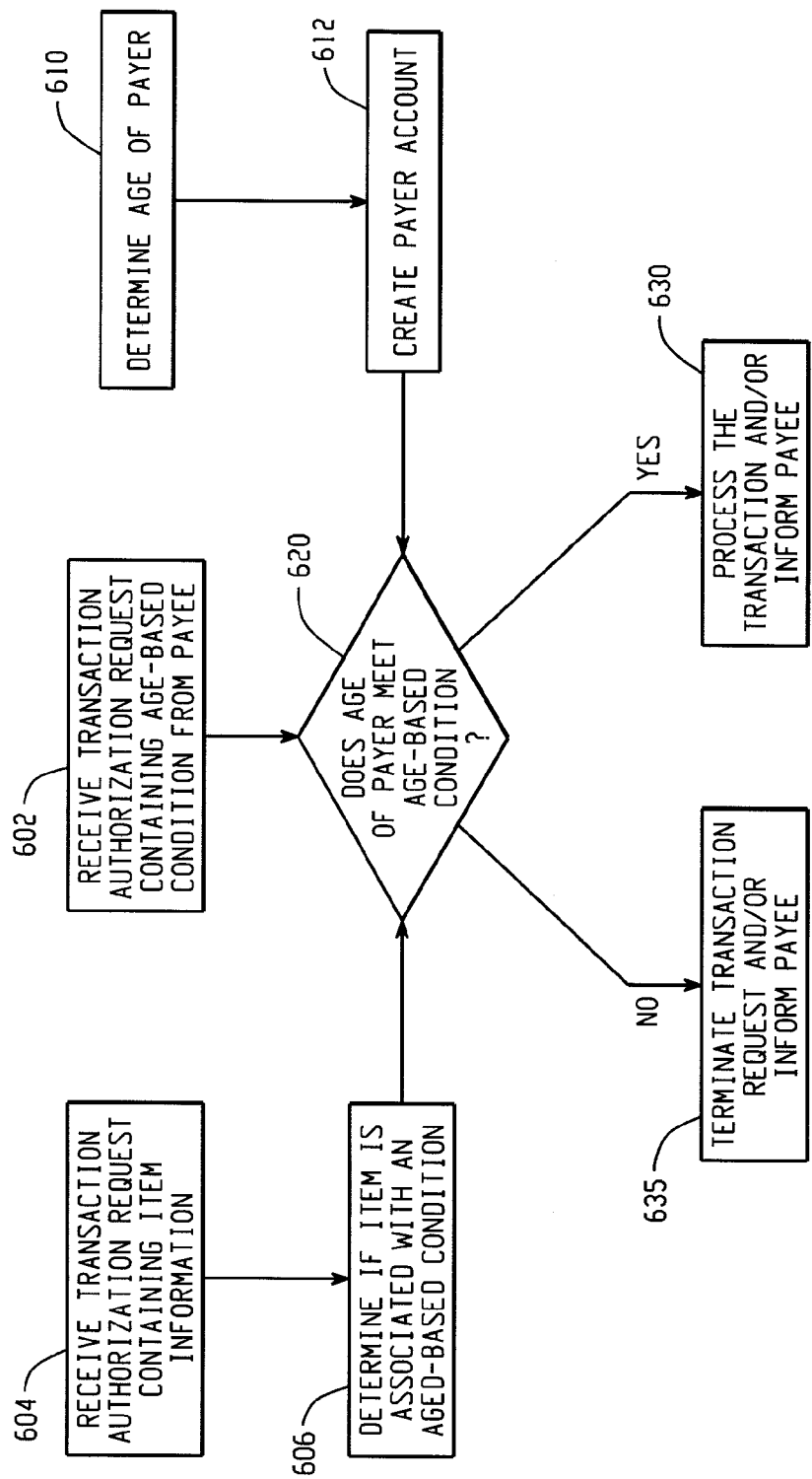
FIG. 6 is an example flow diagram for determining the application of age-based criteria.

FIG. 6 is an example flow diagram for authorizing a transaction based on an age-based condition. Initially, a transaction authorization request is received that includes information associated with an age-based condition as part of the transaction data. This information may be the age-based condition itself as shown in step 602. Alternatively, the transaction authorization request contains item information as part of the transaction data 604, such as information identifying an item for purchase. In this case, the funds facilitation system 108 determines if the item is associated with an age-based condition previously stored in a database 606.

A payer establishes an account before the requested transaction takes place. This process includes a query to determine the age of the payer 610. After the age is determined, the payer account is created 612. In one example, an account cannot be opened unless an age is provided. Requesting age information at the outset of account generation at the funds facilitation system 108 should decrease untrue responses, since the request is made apart from any specific product purchase that may have an age-based condition. Optionally, the age of the payer can be verified electronically, e.g., through a third-party identification check on passport and/or driver's license, and/or through the association of other age-related indicators, e.g., a credit card in the user's name.

The funds facilitation system 108 compares the age-based condition, determined from the transaction data with the age information associated with the payer account to determine whether the age of the payer meets the age-based condition 620. If the payer does meet the age-based condition, then the system 108 processes the transaction and/or informs the payee that the payer meets the age-based condition 630. If the payer does not meet the age-based condition, then the system 108 terminates the transaction request and/or informs the payee that the payer does not meet the age-based condition 635.

In another example, instead of an age-based condition, the example shown in FIG. 6 can be performed based on a different condition. For example, other data from the user account is compared with a defined condition in order to determine if the transaction will be authorized and/or processed. Examples of user account data that may be used to determine whether to authorize the transaction and/or discount or special pricing to apply to the transaction and/or other promotional benefits to associate with the transaction includes payment source information, recent transaction activity information, or location information. Other data may also be used. In the case of location information, some items may be illegal for purchase in some locations, and thus the payee would want to determine whether the payer resides in such locations before processing the transaction. The payee may also want to only do business with or may only want to extend a promotional benefit to payers that have certain payment sources associated with their account or have certain data reflected in their transaction history.

The above steps may be performed by software executable on one or more data processors.

In a more specific embodiment of the transaction authorization process an additional field is displayed 701 to a payee/merchant (e.g., in a purchase authorization request message). A determination 702 is made as to whether the merchant/payee filled in the field and how the merchant/payee filled in the field. In some implementations, if the field is left blank, the funds facilitation system 108 will not check or apply 703 any age-based criteria.

If the field is populated by a positive integer 704, then the fund facilitation system 108 will interpret the instruction to indicate that the seller requires the user to be greater than or equal to the positive integer 708, in years of age, in order for the transaction to be approved.

In some implementations, if the field is populated by a negative integer 705, then the system will interpret the instruction to indicate that the seller requires the user to be less than or equal to the absolute value of the negative integer 706, in years of age, in order for the transaction to be approved.

If the field is populated by both a positive integer 704 and a negative integer 707 (including an appropriate separator), then the fund facilitation system 108 will interpret the instruction to indicate that the seller requires both criteria to be applied 709 in order for the transaction to be approved. For example, if the negative integer has an absolute value which is higher than the positive integer, then the purchaser must be in the age range from the positive integer to the negative integer. For example, "14;-17" would indicate the purchaser must be between 14 and 17 years of age, including both 14 and 17, to meet the criteria). In another example, if the positive integer has a value which is higher than the absolute value of the negative integer, then the purchaser must be of one of the two age ranges. For example, "65;-17" would indicate that the purchaser must be either 65 years of age or older, or 17 years of age or younger.

In some implementations, more than one set of age-based criteria may be provided with specific prices assigned to each age range. For example, this can be done to set the transaction value of an item at normal price unless a user is within a specific age-range criteria. If the user is within a specific age-range criteria, then the transaction value of an item can be set at a specific price associated with that age range. As another example, a specific percentage or value discount associated with that age range can be applied. Additionally, the discount can be indicated in a line item. Alternatively, all such parameters could be set as conditions in the promotion processing system described in the discussion of FIGS. 2-5.

In some implementations, merchants/payees can add additional instructions for determining acceptable age-related information for approving a transaction.

The merchant/payee can be provided with information related to what information was used to check the age in addition to the result; for example, in an additional field added to a purchase authorisation response message. In some implementations, a purchase authorization response message can include a result code indicative of which criteria were met or not met. For example, if no age-based criteria are met, the result code can be a "0" and the transaction would be declined. If a single set of age-based criteria are met, then the result code can be a "1" and the transaction would be approved. If multiple age criteria are provided, then a result code of "1", "2", "3", . . . "n" can be provided (e.g., based on which age criteria is met).

In some implementations, a purchase authorization response message can include a date-of-birth code to indicate how the date of birth used in the age criteria check has been validated. For example, "S" can indicate that the date of birth was self-declared at time of registration. "V" can indicate that the date of birth was verified electronically (e.g., through a third-party identification check on passport and/or driver's license).

In some implementations, a purchase authorization response message can include a payment instrument code to indicate the highest ranking payment instrument associated with the account, from the following (listed in hierarchical order from highest ranking to lowest):

C=Credit
D=Debit
P=Prepaid
B=Bank Account
N=None

A response including age indicator data can include a notation embedded in the response which includes the text of the disclaimer, as noted above. Additionally, age indicator request criteria and age indicator response data, including the result code, date of birth, and payment instrument code, may be included in both the merchant/payee view and the administrative view of the transaction details, but not the payer's view. Moreover, an age indicator response field in the merchant/payee transaction details view may include a link to the disclaimer language noted above, which would load as a dialogue message box on a page when activated.

Figure 7:
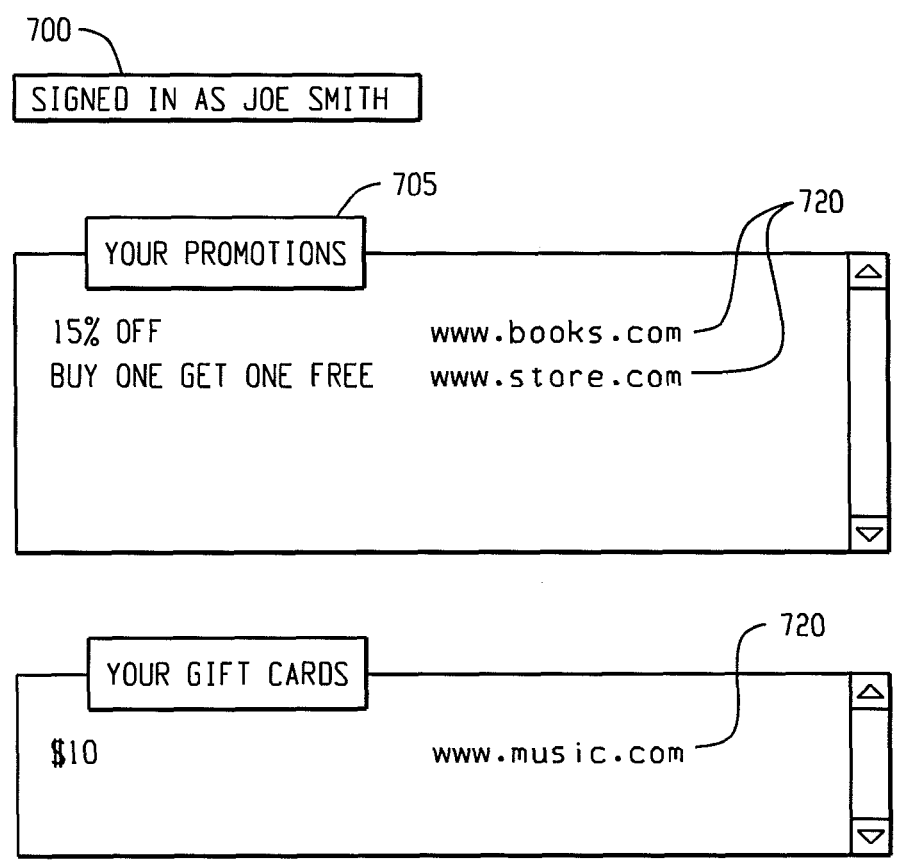
FIG. 7 is a second example flow diagram for determining the application of age-based criteria.

FIG. 7 shows an example user interface 700 for displaying gift and promotion codes to an associated payer. The user interface is provided on a display device. The promotion and gift codes, when obtained, are stored in a database and associated with the payer user account. The promotion and gift codes may be entered manually by the payer or they may be automatically electronically delivered by the promotion processing system. For example, the user account interface 700 displays the unused promotion codes 705 and gift codes 710 and includes links 720 to the merchant site where the unused promotion codes and gift codes may be used. The funds facilitation system may store in a database and display at a user interface a record of the date the promotion code or gift code was used and a link to the associated transaction information.

Figure 8:
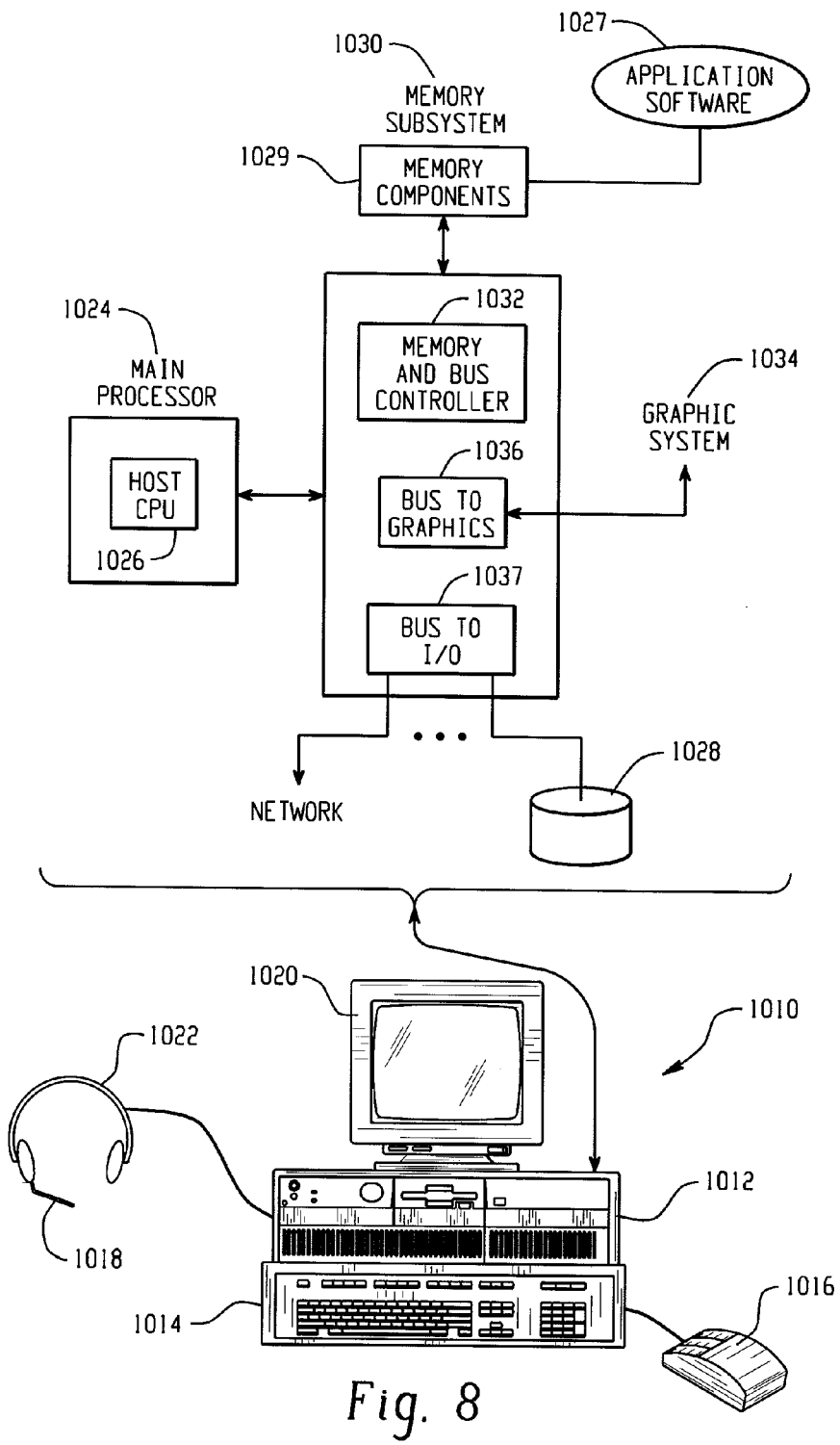
FIG. 8 illustrates example hardware on which the various embodiments of the method of the present invention may be practiced.

FIG. 8 is a block diagram of hardware 1010 which may be used to implement the various embodiments of the method of the present invention. The hardware 1010 may be a personal computer system comprised of a computer 1012 having as input devices keyboard 1014, mouse 1016, and microphone 1018. Output devices such as a monitor 1020 and speakers 1022 may also be provided. The reader will recognize that other types of input and output devices may be provided and that the present invention is not limited by the particular hardware configuration.

Residing within computer 1012 is a main processor 124 which is comprised of a host central processing unit 1026 (CPU). Software applications 1027, such as the method of the present invention, may be loaded from, for example, disk 1028 (or other device), into main memory 1029 from which the software application 1027 may be run on the host CPU 1026. The main processor 124 operates in conjunction with a memory subsystem 130. The memory subsystem 130 is comprised of the main memory 1029, which may be comprised of a number of memory components, and a memory and bus controller 1032 which operates to control access to the main memory 1029. The main memory 1029 and controller 1032 may be in communication with a graphics system 134 through a bus 1036. Other buses may exist, such as a PCI bus 1037, which interfaces to I/O devices or storage devices, such as disk 1028 or a CDROM, or to provide network access.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine-generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed o a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method for processing promotions, performed by a funds facilitation system that facilitates transactions between payers and payees, the method comprising:
    storing, by the funds facilitation system, promotion rules in a database, each promotion rule associating a promotion with a payee;
    receiving, by the funds facilitation system, a transaction authorization request from a payee for a transaction, the transaction authorization request including identification of the payee, identification of a payer and a transaction amount;
    comparing, by the funds facilitation system, the identification of the payee to the promotion rules stored in the database to identify a promotion that is associated with the payee;
    determining, by the funds facilitation system, an age of the payer without being informed of the payer's age by the payee;
    authorizing, by the funds facilitation system, the transaction to the payee in which the promotion is applied to the transaction, wherein the authorization is conditioned on the payer's age meeting a predetermined age condition; and
    transferring funds from the payer's account to the payee's account in response to the transaction being authorized.

2. The method of claim 1 wherein the promotion is a discount on the transaction amount, and the transferred funds correspond to the transaction amount minus the discount.

3. The method of claim 2 wherein the discount is a percentage of the transaction amount.

4. The method of claim 2 wherein the discount is a set monetary amount.

5. The method of claim 1 wherein the promotion is for a future purchase transaction.

6. The method of claim 1 wherein the promotion is for a non-purchase item.

7. The method of claim 6 wherein the non-purchase item is entry into a drawing.

8. The method of claim 1 further comprising:
sending, to the payee, information about a second promotion that is available to the payer, for the payee to forward to the payer.

9. The method of claim 8 wherein the second promotion is a cross promotion from another payee.

10. The method of claim 1 further comprising:
determining whether the payer's account has sufficient funds to pay for the transaction; and
conditioning the authorization on determining that the payer's account has sufficient funds.

11. The method of claim 1 wherein the payee corresponds to a merchant website.

12. The method of claim 1 further comprising:
the funds facilitation system determining the payer's age from age data that is linked to an account that the payer has with the funds facilitation system.

13. The method of claim 1 wherein the transaction authorization request identifies a purchase item, and the funds facilitation system determines, without being informed by the payee, applicability of the age condition to the transaction based on identity of the purchase item.

14. The method of claim 1 further comprising:
conditioning the transaction authorization based on a condition, set by the payee about the payer, being met.

15. The method of claim 14 wherein the condition is age of the payer, and the funds facilitation system determining the payer's age without being informed of it by the payee.

16. The method of claim 1 further comprising:
conditioning the authorization of the transaction of the promotion on a demographic fact, about the payer, meeting a predetermined demographic condition; and
the funds facilitation system determining the demographic fact about the payer without being informed of it by the payee.

17. The method of claim 16 wherein the demographic fact is selected from the payer's age, location and birthday.

18. The method of claim 16 wherein the conditioning is based on a condition that is, prior to receiving the transaction authorization request, stored in the database and linked to the promotion rule.

19. The method of claim 16 wherein the condition is included by the payee in the transaction authorization request.

20. The method of claim 16 further comprising:
the funds facilitation system determining the demographic fact about the payer from demographic data that is linked to an account that the payer has with the funds facilitation system.

21. The method of claim 1 further comprising:
conditioning the authorization of the transaction of the promotion on an action by the payer relating to accounts that are managed by the funds facilitation system.

22. A funds facilitation system comprising:
a database that stores promotion rules, each promotion rule associating a promotion with a payee;
a processor in communication with the database; and
memory in communication with the processor and storing instructions that, when executed by the processor, cause the funds facilitation system to:
receive a transaction authorization request from a payee for a transaction, the transaction authorization request including identification of the payee, identification of a payer, and a transaction amount;
compare the identification of the payee to the promotion rules stored in the database to identify a promotion that is associated with the payee;
determine an age of the payer without being informed of the payer's age by the payee;
authorize the transaction to the payee in which the promotion is applied to the transaction, wherein the authorization is conditioned on the payer's age meeting a predetermined age condition; and
transfer funds from the payer's account to the payee's account in response to the transaction being authorized.

23. The system of claim 22 wherein the promotion is a discount on the transaction amount, and the transferred funds correspond to the transaction amount minus the discount.

24. The system of claim 22 wherein the promotion is for a future purchase transaction.

25. The system of claim 22 wherein the promotion is for a non-purchase item.

26. The system of claim 22 wherein the memory further includes instructions to cause the system to send, to the payee, information about another promotion that is available to the payer, for the payee to forward to the payer.

27. The system of claim 22 wherein the memory further includes instructions to cause the system to condition the transaction authorization on the payer's age meeting a predetermined age condition and to determine the payer's age without being informed of it by the payee.

28. The system of claim 27 wherein the memory further includes instructions to cause the system to determine the payer's age from age data that is linked to an account that the payer has with the funds facilitation system.

29. The system of claim 22 wherein the memory further includes instructions to cause the system to condition the authorization of the transaction of the promotion on a demographic fact about the payer meeting a predetermined demographic condition and to determine the demographic fact about the payer without being informed of it by the payee.

30. The system of claim 22 wherein the memory further includes instructions to cause the system to condition the transaction authorization based on a condition, set by the payee about the payer, being met.

31. A tangible, non-transitory computer-readable medium storing instructions that, when executed by a funds facilitation system, cause the funds facilitation system to:
store promotion rules in a database, each promotion rule associating a promotion with a payee;
receive a transaction authorization request from a payee for a transaction, the transaction authorization request including identification of the payee, identification of a payer, and a transaction amount;
compare the identification of the payee to the promotion rules stored in the database to identify a promotion that is associated with the payee;
determine an age of the payer without being informed of the payer's age by the payee;
authorize the transaction to the payee in which the promotion is applied to the transaction, wherein the authorization is conditioned on the payer's age meeting a predetermined age condition; and
transfer funds from the payer's account to the payee's account in response to the transaction being authorized.

* * * * *